(12) United States Patent
Mgrdechian et al.

(10) Patent No.: US 8,265,654 B2
(45) Date of Patent: Sep. 11, 2012

(54) SYSTEM AND METHOD FOR PROXIMITY AREA NETWORKING FOR SELECTION OF MESSAGING

(75) Inventors: Richard Mgrdechian, San Francisco, CA (US); Man-ho Lawrence Lee, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/186,911

(22) Filed: Jul. 20, 2011

(65) Prior Publication Data

US 2012/0015668 A1 Jan. 19, 2012

Related U.S. Application Data

(63) Continuation of application No. 11/055,310, filed on Feb. 10, 2005, now Pat. No. 7,545,784.

(60) Provisional application No. 60/544,209, filed on Feb. 11, 2004, provisional application No. 60/549,484, filed on Mar. 1, 2004, provisional application No. 60/550,262, filed on Mar. 3, 2004.

(51) Int. Cl.
*H04Q 7/20* (2006.01)

(52) U.S. Cl. ........... 455/456.1; 455/418; 455/550.1; 370/338; 709/219

(58) Field of Classification Search ............. 455/414.1, 455/418–420, 456.1, 456.3, 550.1; 370/328, 370/338, 349; 709/203, 219
See application file for complete search history.

(56) References Cited

U.S. PATENT DOCUMENTS

| 5,839,076 A * | 11/1998 | Becher .................... 455/461 |
| 6,618,593 B1 * | 9/2003 | Drutman et al. ........... 455/456.3 |
| 7,280,822 B2 * | 10/2007 | Fraccaroli ................. 455/414.3 |
| 7,529,537 B2 * | 5/2009 | Ford et al. ................. 455/404.1 |
| 8,014,763 B2 * | 9/2011 | Hymes ...................... 455/414.2 |

* cited by examiner

*Primary Examiner* — Nhan Le
(74) *Attorney, Agent, or Firm* — James J. DeCarlo; Greenberg Traurig, LLP

(57) ABSTRACT

Embodiments of the present invention include improved communication system and methods. In one embodiment, the present invention includes a wireless communication method comprising, on a first wireless device, receiving one or more wireless device identifications associated with one or more other wireless devices, and transmitting at least one of the one or more wireless device identifications from the first wireless device to a remote computer system, and on the remote computer system, receiving the at least one wireless device identification, and accessing information associated with the at least one wireless device identification. Embodiments of the present invention may be used for electronic dating, social networking and other communication applications.

20 Claims, 17 Drawing Sheets

| | |
|---|---|
| Interested In | ⬜ Dating<br>⬜ Serious Relationship<br>⬜ Friends<br>⬜ Activity Partners |
| Activities (Specify up to 3) | [ ] [ ] [ ] |
| Location | |
| Hometown | |
| Age (range) | ○ Under 18  ○ 18-25  ○ 26-30  ○ 31-35<br>○ 36-40  ○ 41-45  ○ 46-50  ○ Over 50 |
| High School | |
| College (e.g., Caltech) | |
| Grad School | |
| Area of Major | |
| Occupation | |
| Religion | ○ Agnostic  ○ Atheist  ○ Buddhist  ○ Catholic  ○ Christian Orthodox  ○ Christian Protestant  ○ Hindu  ○ Islam  ○ Jewish  ○ Scientology  ○ Spiritual but not religious  ○ Others  ○ Very Religious  ○ Somewhat Religious  ○ Not Religious |
| Politcal Views | ○ Very Conservative  ○ Conservative  ○ Middle of the road<br>○ Liberal  ○ Very liberal  ○ Not political |

*Fig. 3C*

| | |
|---|---|
| Zodiac Sign | ○ Aries (March 21 - April 19) ○ Taurus (April 20 - May 20) ○ Gemini (May 21 - June 21) ○ Cancer (June 22 - July 22) ○ Leo (July 23 - Aug 22) ○ Virgo (Aug 23 - Sept 22) ○ Libra (Sept 23 - Oct 23) ○ Scorpio (Oct 24 - Nov 21) ○ Sagittarius (Nov 22 - Dec 21) ○ Capricorn (Dec 22 - Jan 19) ○ Aquarius (Jan 20 - Feb 18) ○ Pisces (Feb 19 - March 20) |
| Top Interests | ☐ Arts ☐ Community Service ☐ Computers/Internet ☐ Cooking ☐ Dancing ☐ Dining ☐ Family ☐ Gaming ☐ Gardening ☐ Health/Fitness ☐ Movies ☐ Music - Listening ☐ Music - Playing ☐ Outdoor Activities ☐ Photography ☐ Reading ☐ Religion/Spirituality ☐ Sports - Playing ☐ Sports - Watching ☐ Television ☐ Theater ☐ Travel ☐ Other: Specify |
| Favorite Music or Bands (e.g., Rolling Stones) | |
| Favorite Books (e.g., Anything by Issac Asimov) | |
| Favorite TV Shows (e.g., X-Files) | |
| Favorite Movies (e.g., Star Wars) | |
| Other Languages (e.g., Japanese) | |
| Short Statement (300 characters or less) Suggestions: Use this field to describe yourself, why you joined this service or the type of person you are looking to meet. | |
| Upload Picture (less than 100k bytes) | <DISPLAY PICTURE>  Delete Picture |

*Fig. 3D*

| Device | Devices in Range |
|--------|------------------|
| A | B, E |
| B | A, C |
| C | B, D |
| D | C |
| E | A |

~ 1000

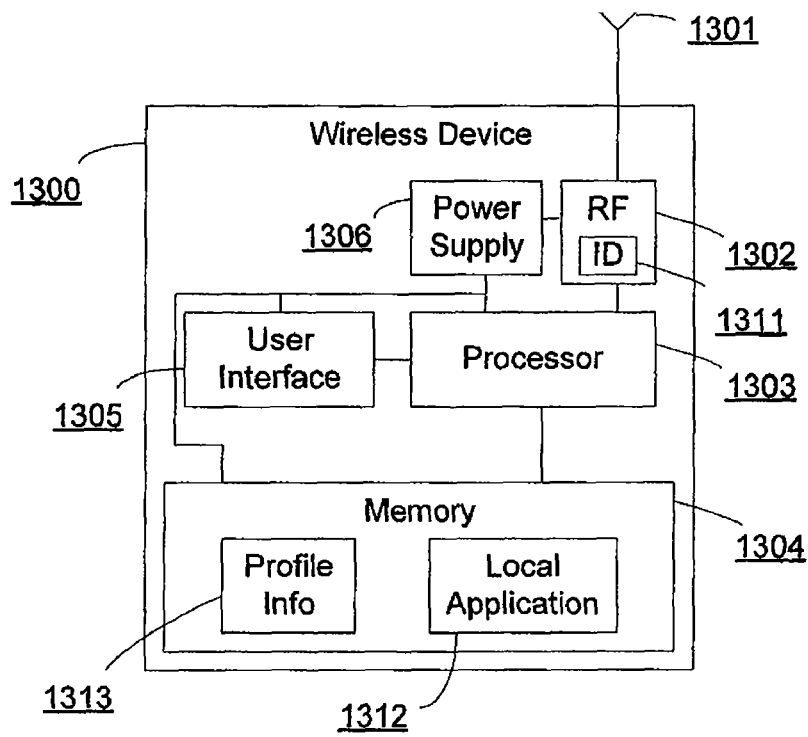
*Fig. 13*
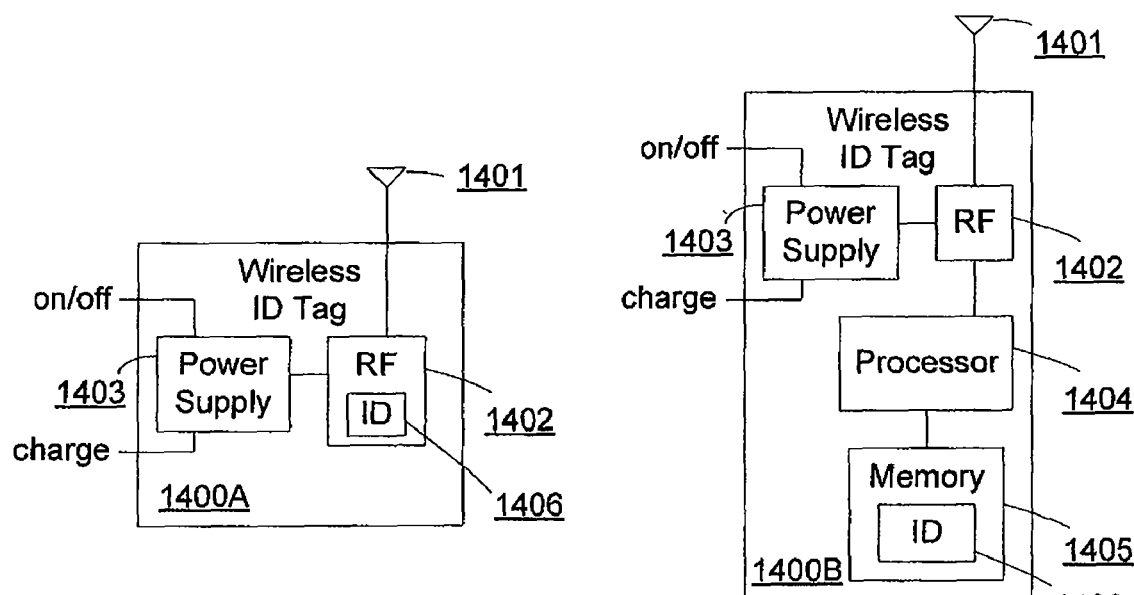
*Fig. 14A*
*Fig. 14B*

SYSTEM AND METHOD FOR PROXIMITY AREA NETWORKING FOR SELECTION OF MESSAGING

RELATED APPLICATIONS

This application is a continuation of, and claims priority from co-pending U.S. patent application Ser. No. 12/395,174, filed Feb. 27, 2009, entitled "System and Method for Communication Between Previously Known and Unknown Users", which is a continuation of U.S. patent application Ser. No. 11/055,310, entitled "System And Method For Wireless Communications Between Previously Known And Unknown Users," filed Feb. 10, 2005, which claims priority under 35 U.S.C. §120 and 37 C.F.R. §1.78; and is further related to and claims priority from U.S. Provisional Application No. 60/544,209 filed Feb. 11, 2004, entitled "Method And Apparatus For Wirelessly Communicating And Messaging Between Previously Known And Unknown Parties," and is also related to and claims priority from U.S. Provisional Application No. 60/549,484 filed Mar. 1, 2004, entitled "Method And Apparatus For Wirelessly Communicating And Messaging Between Previously Known And Unknown Parties," and is also related to and claims priority from U.S. Provisional Application No. 60/550,262 filed Mar. 3, 2004, entitled "Method And Apparatus For Wirelessly Communicating And Messaging Between Previously Known And Unknown Parties," the benefit of the earlier filing date of all of which is claimed under 35 U.S.C. §119(e), and the disclosures of all are each hereby incorporated herein by reference in their entirety.

BACKGROUND

The present invention relates to wireless communication, and in particular, to a wireless communication system and method that provides an exchange of information between wireless devices.

There currently exists a number of ways of obtaining information about a previously unknown party before actually approaching or contacting them. For example, in the case where both parties are in the same physical location, an ideal method is through a mutual friend who may offer or be willing to provide information to one party about the other. This mutual friend may also act as a conduit, allowing the two parties to communicate without any knowledge of the other's identifying information.

Methods for obtaining information about an unknown party also exist in cases where the parties are not in the same physical location. Examples of these methods have historically included classified and personals advertisements, and dating or matchmaking services. In addition, with the advent of the Internet, two extremely efficient methods have emerged as ways of identifying and communicating with previously unknown parties; these two methods are known as on-line dating and social networking.

On-line dating (a business currently dominated by companies such as match.com) is a networking service where members complete user profiles (typically, an anonymous summary of a person's background, likes, dislikes and other information) that are kept in a central database. Users can then employ various search criteria such as gender, geographic location or specific activities which they are interested in participating in to identify a subset of other users who they may be interested in meeting. The user conducting the search can then browse through this subset of other users to view their pictures and individual profiles in order to decide whether or not to contact them. If they choose to contact another user, a message is sent by the service to that specific person.

FIG. 1 illustrates an existing communication system 100 that may be used in an on-line dating application. System 100 includes a computer system 140, such as a server, including an on-line dating web application 150 and database 160. Computer system 140 is coupled to the Internet 130. Users of the system may access the on-line dating application 150 using desktop computers 110 and 120 that are connected to the Internet 130. Contemporary means of connecting and using such on-line dating applications 160 are typically through wired connections and such use typically occurs in the privacy of a user's home or in some other private non-mobile venue. Desktop computers 110 and 120 include Internet browsers 111 and 121 for accessing web pages from web application 150.

FIG. 2 illustrates the process used in an existing on-line dating system. As shown at 101, profiles of users may be stored in database 160. The profiles may include various forms of information about each user and may further include one or more electronic photos of the user. When a user accesses the website, he/she may enter profile search criteria into web browser 111 or 121 as shown at 102. The search criteria are then sent to web application 150 on server 140 where the search is executed. Users may search for a variety of characteristics about other users based on the profile information stored in the database. In response to the search request, the server returns profiles matching the search criteria.

Similarly, users of social-networking services (such as Friendster and LinkedIn) fill-out profile information that is stored in a central database. However, in the case of social networking services, the profiles are associated with other users in the form of a "hub-and-spoke" system, where each user is linked to one or more third-parties through another user with which they have a pre-existing relationship (i.e., personal or business connections). As in the case of on-line dating services, users can use various search criteria to identify a subset of other users whom they may be interested in meeting. However, in the case of social networking systems, users are generally allowed to contact or view the profiles of only those users with whom they are connected to through this hub-and-spoke system who are separated from them by less than a pre-defined number of connections.

Despite these differences, a key limitation of both on-line dating and social networking services is that both require a user to initiate a search based on specific qualities or characteristics; it is only after they've identified and contacted a person will they actually have the opportunity to meet them in a real world situation. Similarly, in the case where both parties are in the same physical location but do not have any mutual friends who can provide them with information about the other, there is no effective way to identify what this information is. Currently, there is no efficient methodology for combining and extending the efficiencies of online-dating and social networking service to real world situations where a person may quickly obtain information about a specific individual that he or she may encounter but does not yet know anything about.

Given this current limitation, it would clearly be advantageous to develop a system whereby a user could access information about a specific person in their general location in order to decide whether potential compatibilities (either business or personal) may exist between them. In the same way, it would be useful if a system existed whereby a user could identify mutual friends which they may have in common with a person in their general location. At the same time, it would be valuable to have a system whereby a user could initiate communications with this person by sending them a message (which may include the sender's user profile) at some point after reviewing their information. More generally, it would be advantageous to have a system that would allow communication of information corresponding to a person's dynamically changing environment.

Thus, existing systems are not useful in dynamic situations where one or more users want to wirelessly communicate information. Consequently, there is a need for improved communication system and methods.

SUMMARY

Embodiments of the present invention include improved communication system and methods. In one embodiment, the present invention includes a wireless communication method comprising, on a first wireless device, receiving in the first wireless device one or more wireless device identifications associated with one or more other wireless devices, and transmitting at least one of the one or more wireless device identifications from the first wireless device to a remote computer system, and on the remote computer system, receiving the at least one wireless device identification, and accessing information associated with the at least one wireless device identification. In one embodiment, the information is profile information.

In one embodiment, the method further comprises, on the first wireless device, transmitting a wireless identification request. In another embodiment, the method further comprises transmitting the information associated with the at least one wireless device identification from the remote computer system to the first wireless device. In another embodiment, the method further comprises receiving the information associated with the at least one wireless device identification.

In another embodiment, the one or more wireless device identifications are unique identifications. In yet another embodiment, the unique identifications include a Bluetooth identification or an RFID.

In another embodiment, the first wireless device and the one or more other wireless devices are coupled together using a first local wireless protocol, and the first wireless device and the remote computer are coupled together over a second wireless network.

In one embodiment, at least one of the one or more other wireless devices is a wireless ID tag.

In another embodiment, the method further comprises sending a message. In one embodiment, the message is sent from the first wireless device to at least one of the one or more other wireless devices. In another embodiment, the message is sent from the first wireless device to the remote computer system. In one embodiment, the message is an advertisement. In one embodiment, the remote computer system filters the message based on the information associated with the at least one wireless device identification. In another embodiment, the method further comprises transmitting a wireless device identification of the first wireless device to the remote computer system, wherein the remote computer system filters the message based on information associated with the wireless device identification of the first wireless device.

In another embodiment, the present invention includes a communication method comprising receiving in a first wireless device one or more wireless device identifications associated with one or more other wireless devices, transmitting at least one of the one or more wireless device identifications from the first wireless device to a remote computer system, and receiving information associated with the one or more wireless device identifications from the remote computer system in the first wireless device.

In one embodiment, the method further comprises transmitting an identification request from the first wireless device.

In yet another embodiment, the present invention includes a computer system coupled to a network, the computer system including software for performing a method comprising storing a plurality of wireless device identifications, storing information for a plurality of users, associating the wireless device identifications with the information, receiving one or more wireless device identifications from a wireless device, accessing the information associated with the one or more wireless device identifications, and transmitting the information associated with the one or more wireless device identifications to the wireless device.

In one embodiment, the wireless device identifications and information are stored in a database accessible over the Internet.

In another embodiment, accessing the information comprises generating a query to a database using the one or more wireless device identifications and retrieving information associated with the one or more wireless device identifications in response to the query.

In yet another embodiment, the method further comprises receiving a correspondence instruction from at least one wireless device, and in accordance therewith, sending a message to at least one of the plurality of users.

In yet another embodiment, the present invention includes a wireless device comprising a power supply, an antenna, and an RF circuit coupled to the power supply for receiving power and coupled to the antenna for receiving and transmitting data, wherein the RF circuitry includes a device identification, and wherein the RF circuitry is isolated from user inputs and outputs. In one embodiment, the device receives an identification request through the antenna, and in accordance therewith, transmits the device identification. In other embodiments, the device is embedded in a watch, a broach, a pendant, a necklace, a ring, an earring, an article of clothing, a clothing label, a wallet or a key-chain. In other embodiments, the device is integrated into a credit-card form-factor.

In one embodiment, the present invention allows a user to: 1) view the profile of any other user in their immediate vicinity; 2) identify mutual friends, colleagues or associates who they may have in common with this other user; and 3) send a message to this user without necessarily having any prior knowledge of the recipient's identifying information, where the identifying information of the recipient may remain hidden from the sender and is known only to the service itself.

In one embodiment, a communication process is initiated by a user (the "Sender" or "User A", using "Device A") interested in viewing the profile of another user (the "Recipient" or "User B", using "Device B"), identifying any mutual friends they may have in common or in sending a message to them. To begin this process, Device A broadcasts a wireless inquiry to neighboring devices, including Device B, requesting that they provide their unique identification numbers to Device A. Upon receipt of this inquiry, each device, including Device B broadcasts its unique ID back to Device A. The inquiry by Device A can be made in any number of ways including a directional electromagnetic or ultrasonic beam sent from Device A in the direction of Device B which queries an RFID tag or similar device, or through an omni-directional method or wireless protocol (such as any Bluetooth or any 802.11 standard) in which all devices within a given distance are queried.

In one embodiment, response to the inquiry for an ID may be done via the same wireless protocol as the inquiry. In one embodiment, the response to the inquiry for an ID may be done or via a different wireless protocol as the inquiry. In addition, embodiments of the devices can include cases where the ID's are static, dynamic or pseudo-random.

Upon receipt of the unique ID of Device B (and of any other devices that respond to the inquiry for their ID), Device A may upload these IDs to a central service which may include a website, a database and one or many servers. The system will then match the IDs provided by Device A with those of registered users and download the images of the users associated with the IDs back to Device A.

An alternate embodiment may include the case where the image is provided directly to Device A from Device B. Alternate embodiments may also include the exchange of IDs such that Device A sends a file containing its ID along with information regarding the message to be sent or the information requested directly to Device B. Embodiments of the invention may include cases where both devices exchange ID or other information (i.e. there is a reciprocal exchange of information). The information sent between devices may or may not be encrypted.

Once Device A has received images of the neighboring users from the server or through other means, User A can scroll through them to uniquely select the person with whom they are attempting to communicate or whose profile they wish to view. Upon selection of this person, Device A may upload the request via the cellular network to the server which will then download the associated profile of User B to Device A. At that point, User A can then review the profile of User B, create and send a message or forward his own user profile to User B.

Embodiments of the invention may include pre-recorded or customized messages stored on Device A or stored on the server. Although these messages may be sent directly from Device A to Device B, these messages may also be delivered to User B by the server.

In one embodiment, the server may also provide a user with information regarding "friends of friends", essentially acting as a mobile "social-networking" service.

Alternate embodiments include the cases where: 1) Device A communicates with the server via a cable, cradle or other physical connection to a PC or other electronic apparatus which can relay ID or other information to the server; or 2) through any form of wireless connection such as Bluetooth Wi-Fi or 802.11 which could relay the ID and messaging information either directly or through some intermediary (such as a cellular network or PC) to the server. An additional alternate embodiment includes the case where Device A displays the IDs to User A at some later time when User A can log-on or access the server and manually enter the information.

Once the information regarding the identity of User A, the unique ID of Device B and the selection of which message to send (including either their user-profile or a customized message) has been received by the server, message delivery may be contingent on a number of pre-set conditions including whether User B has an interest in receiving messages from someone with the profile of User A, the form of the message, the number of messages User B is willing to receive in a given day and other preferences designed to filter unwanted, repetitive, overwhelming or otherwise undesirable messages (i.e. spam) to avoid annoying, harassing or overloading the Recipient.

In the event that the server determines that the message or sender does not meet the preset conditions to be sent to the Recipient, the message will be discarded.

In the event that the server determines that the message or Sender does meet the preset conditions to be sent to the Recipient, the Recipient will receive or be notified of the message which may then be delivered to, or retrieved by the Recipient in any of a number of ways including logging on to the server, or through any other means as technically feasible including via cell phones, PDA's or email. The recipient can choose to be notified immediately upon receipt of such a message, on a periodic basis or through a manual inquiry at the time of their choosing.

An additional embodiment of the present invention provides that the Sender can specify whether they want their message delivered to the Recipient as quickly as possible, or on a delayed basis.

Upon receipt or retrieval of the message, the Recipient could choose to ignore the message, to not be contacted by the Sender again or to respond to the message. The present invention provides that the users of the service can respond anonymously or pseudonymously to the Sender through the server or that they can directly respond to the Sender if contact information is made available.

The Devices (A and B) themselves can be of multiple forms including ones with only the discrete functionality of the present invention, or integrated into or with other devices such as cell-phones, PDA's or music players either through embedded hardware or as a software application. In addition, the devices can have the capability to act as both Sender and Recipient (for users interested in sending and receiving messages), to act only as a Sender (for users not interested in receiving messages) or to act only as a Recipient (for users who are interested in receiving messages). Additionally, particularly in the case of a Recipient-only device, one embodiment of the present invention provides that the form-factor can be such that the device appears as a piece of jewelry such as a broach, pendant, ring, earring, or as a clothing label, a key-chain, integrated into a credit-card form-factor, integrated into clothing itself or as some other fashion statement which can be both aesthetically pleasing and alert others that a person is a user of the system.

In the case where messages are not sent directly between devices and primarily ID information is exchanged, the invention provides numerous advantages including lower power, lower-bandwidth requirements, reduced electronics complexity and cost and leveraging of the existing communications infrastructure.

In another embodiment of the present invention, Device A automatically queries other devices for their IDs, receives one or many responses to its request and communicates this information to the server, which then compares the profiles associated with the IDs to the pre-defined preferences of User A. If any of the profiles match these preferences, an alert is sent to User A to indicate the presence of a person-of-interest. In a variation of this embodiment, User A can be a business or other organization (such as an advertiser) which may take some additional action based on the presence of a person with a specific profile. For example, a business or advertiser may retrieve profiles and forward information or advertisements to such user's accounts. User's of the service may opt to receive and optionally filter such information or advertisements based on predefined criteria (i.e., restaurant ads only).

In another embodiment, a device may continuously or intermittently broadcast its ID and/or other information without having received an inquiry.

In another embodiment, the effective range of the present invention may be extended beyond the range of the wireless protocol used to request IDs from neighboring devices and the server can build a positional routing database to determine users who are likely to be reasonably close to other users, but beyond the range of direct detection. Upon request of Device A, the server may supplement direct responses with indirect responses that User A can select from. By correlating this location information, the server can create what is effectively an expanded or "daisy-chained" network, dramatically increasing the utility and range of the system. In one embodiment, individual users or the server itself can set limitations such that users removed from direct contact beyond a certain number (e.g. more than twice removed) are not included in any query. Another embodiment of the present invention includes the general case where relative positions, ranges or distances of mobile devices are established via direct or peer-to-peer communications, uploaded to a central server via a cellular or other network and used to facilitate communications or provide other data to be used in any way whatsoever.

In yet another embodiment of the present invention, GPS information rather than direct communications between devices is used to provide responses to User A's request to initiate messaging or other actions. The response will be in the form of images or other identifiers of users within a specified range of User A. User A can then uniquely select the Recipient from these responses.

Embodiments of the present invention also include the general case where information is exchanged or allowed to be exchanged between one or more mobile devices using the techniques described herein; specifically, when the identity of the users of these devices may or may not be known to each other and communication of any form between devices is initiated by the wireless exchange of one or more IDs that are uploaded to one or more central servers which then enable, authorize or facilitate information to be conveyed between the devices either directly or through one or more central servers. An example of the use of this technique in such an embodiment would be in case of entertainment or other gaming applications operating on mobile devices when one player decides to initiate or play a game with another. In addition, such applications can be automatically enabled using this technique; for example in the case where devices can automatically detect other users within their vicinity having specific skill levels or who may present some other challenge and automatically notify the user of that person's presence.

An additional embodiment of the present invention includes the use of the service and/or hardware for the electronic commerce applications including micro-payments. Additional embodiments of the present invention also include medical applications where a user profile may contain medical or other information that may be accessed by a doctor, pharmacist, emergency services technician or other health provider.

In another embodiment of the present invention includes software, which can be downloaded into an existing platform to enable it to practice the present invention and perform in the techniques described herein.

Embodiments of the present invention also include any and all business methods for generating revenue and income through the sales of hardware, software and services that include one or more embodiments of the invention described herein. These include (a) selling software for use on an existing hardware platforms to enable the invention, (b) the sale of hardware (including jewelry or other form factors) to enable the invention, and (c) charging users on an annual, monthly or per-message basis for use of the service/invention. These business methods also include the ability to charge users for the exchange of messages or information processed through one or many central servers based on IDs exchanged between mobile devices as described above.

Users of the device and service (i.e. senders or recipients, or both), may include individuals, businesses, not-for-profit organizations, advertisers, political action groups, or any other organization.

The preferred embodiment of the present invention would also include (e.g., as part of the server) a web-based user interface for registration and profile management. Information provided by users through this interface would include, but not be limited to the Bluetooth ID of their mobile device, their name, address, billing information (if applicable), username, profile information, photo, preferences and names of friends. The user interface could also function as a messaging center in which the user can keep track of messages sent or received as well as the profiles that they have viewed. Embodiments of the present invention include hardware or software allowing a mobile device to incorporate some or all of this functionality.

Additional embodiments will be evident from the following detailed description and accompanying drawings, which provide a better understanding of the nature and advantages of the present invention.

BRIEF DESCRIPTION OF THE DRAWINGS

FIGS. 3C-D illustrate some of the profile information that may be associated with a wireless device ID according to one embodiment of the present invention.

FIG. 13 is an example of a wireless device according to another embodiment of the present invention.

FIGS. 14A-B are an examples of wireless identification tags according to another embodiment of the present invention.

DETAILED DESCRIPTION

Described herein are techniques for improving wireless communication between users of wireless devices. In the following description, for purposes of explanation, numerous examples and specific details are set forth in order to provide a thorough understanding of different aspects of the present invention. It will be evident, however, to one skilled in the art that the present invention as defined by the claims may include some or all of the features or embodiments in these examples alone or in combination with other features or embodiments described below, and may further include obvious modifications and equivalents of the features and concepts described herein.

Embodiments of the present invention use wireless protocols and networks for implementing novel methods and algorithms that enhance the wireless communication experience. Wireless protocols may be used gather identification information about other wireless devices active in a certain vicinity. A wireless device may then use such information to learn more about the users of the other devices. Among other features, embodiments of the present invention may allow a user to 1) view the profile (e.g., an anonymous summary of a person's background, likes, dislikes and other information) of any other user in their immediate vicinity; 2) identify mutual friends, colleagues or associates who they may have in common with this other user; and 3) send a text, audio, video or other message (including their own profile) to this user without necessarily having any prior knowledge of the recipient's identifying information such as their name, phone numbers, email addresses or IM user names and where the identifying information of the recipient remains hidden from the sender and is known only to the service itself. The present invention therefore provides users with the ability to select and learn about people they wish to contact based first on the observation of their real-world behavior without requiring them to browse through boring, contrived or misleading classified advertisements or on-line profiles.

Figure 1:
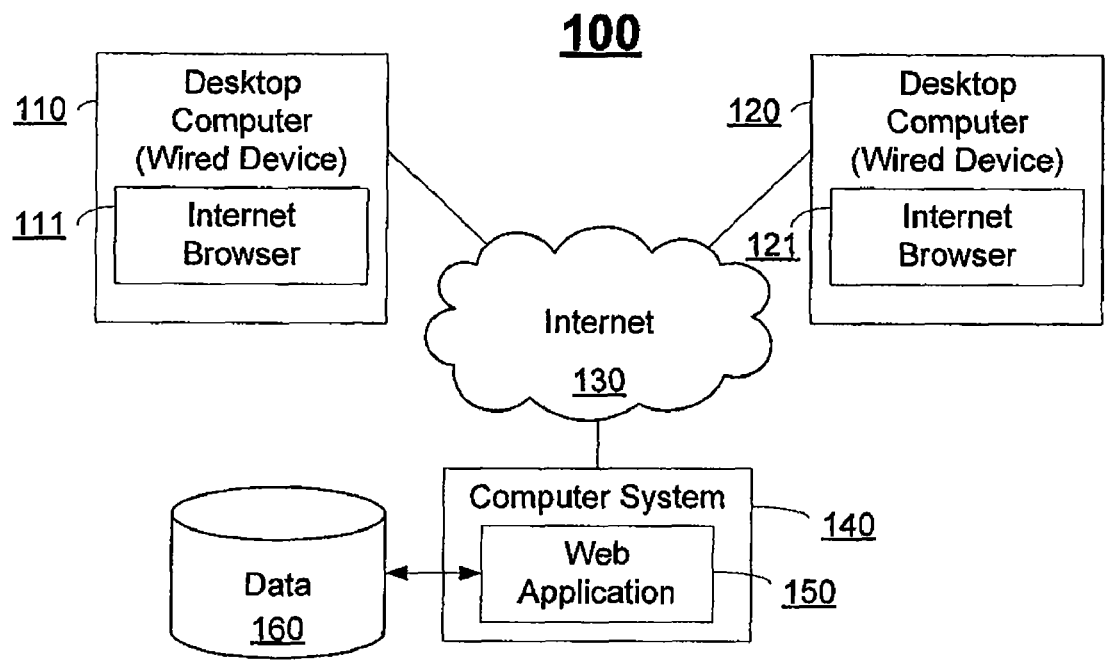
FIG. 1 illustrates an existing communication and messaging system.
Figure 2:
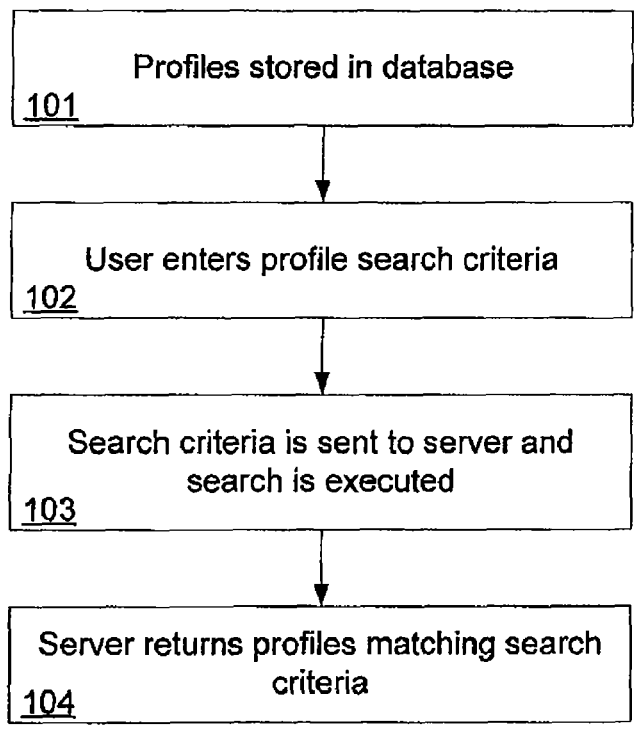
FIG. 2 illustrates process used in an existing communication and messaging system.
Figure 3A:
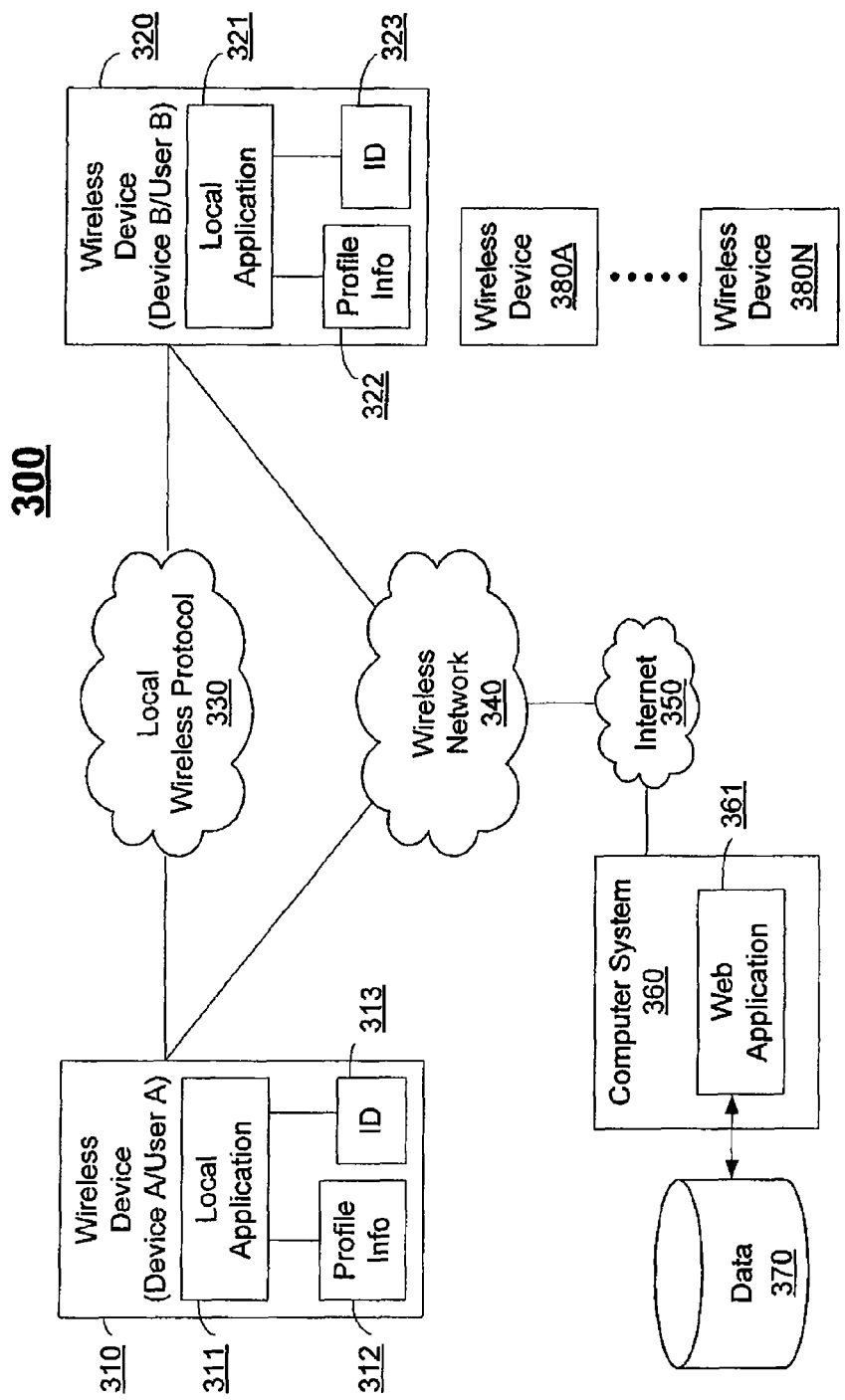
FIG. 3A illustrates a system according to one embodiment of the present invention.

FIG. 3A illustrates a system 300 according to one embodiment of the present invention. System 300 may include wireless devices 310 and 320 that communicate with each other using a local wireless protocol 330. Wireless devices 310 and 320 each include local software applications 311 and 321, respectively, and wireless device identifications 313 and 323, respectively. Communication between wireless devices may be initiated by a first user of one of the wireless devices (e.g., User A of device 310, "Device A") interested in obtaining information about another user. User A may be referred to herein as the initiator or initiating user of the communication, and Device A may be referred to herein as the initiating device. An initiating user is the user who wants to gather information (e.g., such as profile information) about another user and/or send a message to another user. The system further includes another user of one of the wireless devices (e.g., User B of device 320, "Device B"), which may be a device compatible with wireless device 310. User B may be referred to herein as a targeted user, and Device B may be referred to herein as the target device. There can be a plurality of wireless devices 380A-380N that communicate using local wireless protocol 330.

Figure 3B:
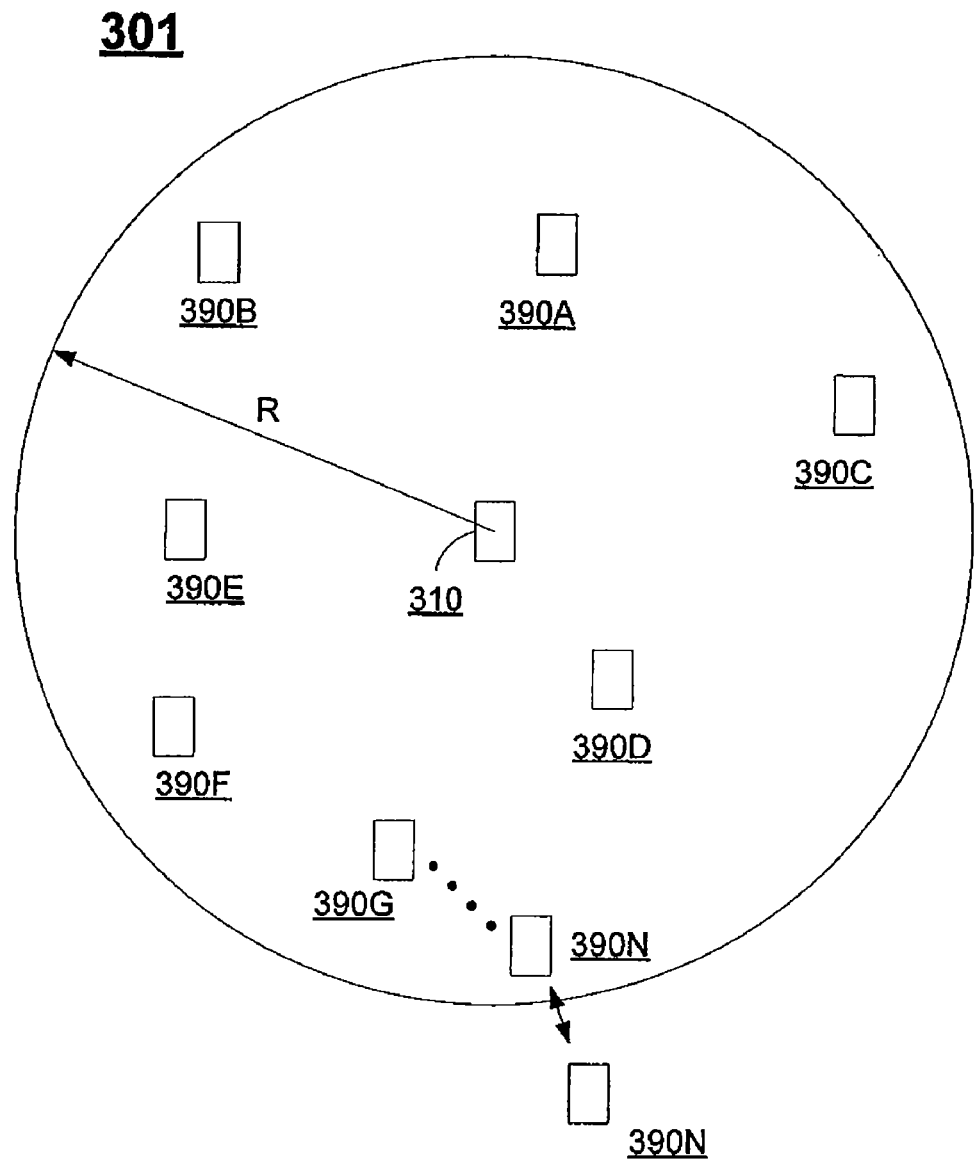
FIG. 3B illustrates a local wireless protocol according to one embodiment of the present invention.

Embodiments of the present invention allow users of wireless devices to interact using a local wireless protocol when the wireless devices are within range of each other. Such devices may be coupled together over an ad hoc or peer-to-peer wireless network, for example. In one embodiment, a local wireless protocol may have a limited range, R, with respect to wireless device 310 so that only wireless devices within such range are detectable. FIG. 3B illustrates a local wireless protocol 301 according to one embodiment of the present invention. A first wireless device 310 may wirelessly communicate with wireless devices 390A-N that are within range of device 310. However, other devices outside the range of device 310 will not be detectable. It should be noted that communication using protocol 301 is dynamic because as users of the wireless devices move, new devices may be detected as they come within range and other devices may become undetectable as they move out of range. For example, if the distance between device 310 and device 390N increases (e.g., if either or both users move), device 390N will not be detectable by device 310. A variety of wireless technologies may be used for protocol 301 having a variety of different ranges. For example, wireless technologies that may be used as a local wireless protocol include Bluetooth, an 802.11 protocol, Zigbee or equivalent wireless technology for establishing a peer-to-peer or ad hoc network or detecting the presence of other wireless devices and exchanging device IDs. Communication between the devices may also include using another mechanism including but not limited to a directional electromagnetic beam or ultrasonic beam sent from Device A in the direction of Device B. The same or different wireless technology may be used for a reply made by Device B to Device A. Embodiments of the presented invention are not limited to any specific currently existing or future wireless technologies. However, protocols such as Bluetooth, 802.11 or Zigbee are particularly well-suited for applications where the other wireless devices are operating in close physical proximity of each other. Moreover, those skilled in the art will understand that the range R of any device is not exact, but rather, signal strengths decrease as the distance between wireless devices increases making connectivity more difficult.

Referring again to FIG. 3A, the process may be initiated when an initiating user (e.g., User A) is interested in obtaining information about another user. For example, as mentioned above, User A may be in the same physical location as User B, and User A may want to meet User B but the conditions are not conducive with a direct communication. Embodiments of the present invention allow a user (e.g., User A) to view information about, and/or send a message to, another user (e.g., User B) if the other user is operating a wireless device in the same area. In one embodiment, an initiating wireless device 310 (i.e., Device A) sends an identification request (i.e., a query or scan) to other wireless devices within range. A plurality of other wireless devices 320 (i.e., Device B) and 380A-380N may receive the request. One or more of the wireless devices 320 and 380A-380N may have wireless device identifications ("device IDs") stored internally (e.g., ID 323 in Device B). When an identification request is received, one or more of these devices may access and transmit a device ID back to initiating device 310 in a reply.

When a reply to the identification request is received in initiating device 310, the initiating device may transmit the device IDs to a remote computer system 360 through wireless network 340 (e.g., a wireless phone network) and the Internet 350, for example. Computer system 360 may be an Internet server computer and may include multiple computers coupled to the Internet for processing information as described herein, for example, and may further include a web application 361. Computer system 360 may provide access to further information about User B or other users associated with the device IDs received from the initiating device. Furthermore, computer system 360 may act as a central storage location for all user information as well as a clearinghouse and delivery system for messages sent between users.

For example, the device IDs may be received by the remote computer system and used by a web application 361 and a database 370 to access information associated with each device ID, such as Device B (i.e., User B). In one embodiment, when computer system 360 receives a device ID, web application 361 may generate a database query using the device IDs received from wireless device 310. Database 370 retrieves information associated with each device ID in the query, and then formats the information to send to the initiating device 310. In one embodiment, device IDs may be included as fields (e.g., indexes) in database tables that are associated with other information in the database, for example. The association may be implemented using a variety of techniques such as associated fields in a relational database or as links or references between objects, for example. The information in database 370 may have been set up previously by a user accessing a web address for computer system 360 (e.g., using the web application 361) or a related website or using a related web application such as an Internet browser. Database 370 may be a single database, distributed database or other data storage systems that can use device IDs to access information associated with device IDs. The associated information may be updated automatically or manually by a user who accesses the information through computer system 360 (e.g., over the Internet or wirelessly). After the associated information has been retrieved, computer system 360 may then transmit the information back to the initiating device for use by the initiating user.

Embodiments of the present invention are particularly advantageous in an on-line dating or social networking application where the information is profile information. FIGS. 3C-D illustrate some of the profile information that may be associated with a wireless device ID according to one embodiment of the present invention. Profile information may include a variety of information about a user's likes and dislikes, background, education, friends and other information such as text, audio, video, images (i.e., electronic pictures of the user), Blogs, links to favorite websites or items or services for sale. In one embodiment, users may specify a list of friends. The web application on the remote computer may then construct lists of mutual acquaintances (e.g., mutual friends or other people that are known by both users) of a given pair of users (e.g., an initiator and target) by accessing and comparing profiles of two users. The list of mutual acquaintances may then be sent to the initiating wireless device. Mutual acquaintances may be accessed via various degrees of separations. In other embodiments, this feature is enabled by individual users uploading names and/or other identifying information, such as email addresses, to the web application upon registration with the service, or at any other time. The web application then constructs the list of mutual friends for all pairings with the available information. Corresponding mutual friend information may be passed on to the wireless devices as part of the profile information. In one embodiment, the system may also provide a user with information regarding "friends of friends," essentially acting as a mobile "social-networking" service in addition to, or in lieu of, a dating service.

In a dating application, remote computer 360 may use device IDs to access profile information (e.g., for registered users of a service) stored in database 370. The system may match the device IDs with profile information in database 370. In cases where a match is found, remote computer 360 may transmit profile information back to the initiating device. Once the initiating device has received images of the users associated with the device IDs from the remote computer, the images may be displayed to the user of the initiating device (i.e., User A). User A can then scroll through the images to uniquely select the person with whom they are attempting to communicate or whose profile they wish to view. Upon selection of this person, the initiating device may access and display the associated profile of User B on Device A. At that point, User A can then communicate with User B in various ways. For example, User B may (a) review the profile of User B, including the names of mutual friends (who may or may not be users of the service), if any, (b) select any of several pre-recorded audio, video, text, or other messages to send to User B, (c) forward his own user profile to User B, or (d) customize and send a message in real-time, or at any time after the initial inquiry, to User B. Accordingly, embodiments of the present invention also include executing software algorithms that control the retrieval of profile information and flow of information between users. Such algorithms may be executed in database 370 or using applications 311 and/or 361. For example, local software application may be used to generate the identification requests for communicating with the remote computer as described herein. Algorithms on the remote computer may include filtering algorithms, messaging algorithms, searching algorithms or other algorithms as described in more detail below.

As mentioned above, computer system 360 may send some or all of the profile information associated with each device ID back to the initiating wireless device (e.g., Device A), and the profile information (e.g., an image or picture of the target user) may be displayed to the user of the initiating wireless device. Profile information for one or more targets may be stored internally on a wireless device or selectively deleted. Some or all of the profile information may be saved (e.g., as a complete profile or as a summary profile). Such profile information may be useful if the initiating user desires to contact such target at a later time. The user of the initiating device may review the profiles and may subsequently interact with other selected users depending on interest by sending message information to selected users. For example, sending message information may include sending another user an anonymous message, sending a saved message (e.g., selecting from available pre-constructed message), creating and sending a new message or sending the initiating user's profile information. Various combinations of such message information may also be selected. Example messages may include text alone or in combination with other information, including different multimedia messages such as audio, image or video. For example, message information may include pure ASCII text with audio, image or video attachments. Audio formats may include files in ".wav" or ".mp3" formats, video formats may include files in "mpeg" format and image formats may include "GIF" or "JPEG", for example.

In some embodiments, message information may be stored on the wireless devices (e.g., Device A). In other embodiments, message information is stored on a remote system, such as computer system 360. Furthermore, messages may be sent directly between wireless devices (e.g., from Device A to Device B), or alternatively, messages may be sent from a wireless device (e.g., initiating Device A) to computer system 360 (e.g., to web application 361 and stored in database 370). When message information is on the remote system, a targeted user (e.g., User B) can opt to logon to the web application 361 at any time and retrieve messages that are received from other users in the network. Such messages may also be automatically forwarded to the selected user's wireless device or any other target location. In some embodiments, web application 361 includes an interface for managing received messages and sent messages. Furthermore, users may save accessed profiles for later review. An initiating user may access computer system 360 at any later time and review the saved profiles and construct messages to profiles of interest. Messages may then be forwarded to the users corresponding to the saved profiles at a later time.

Figure 4:
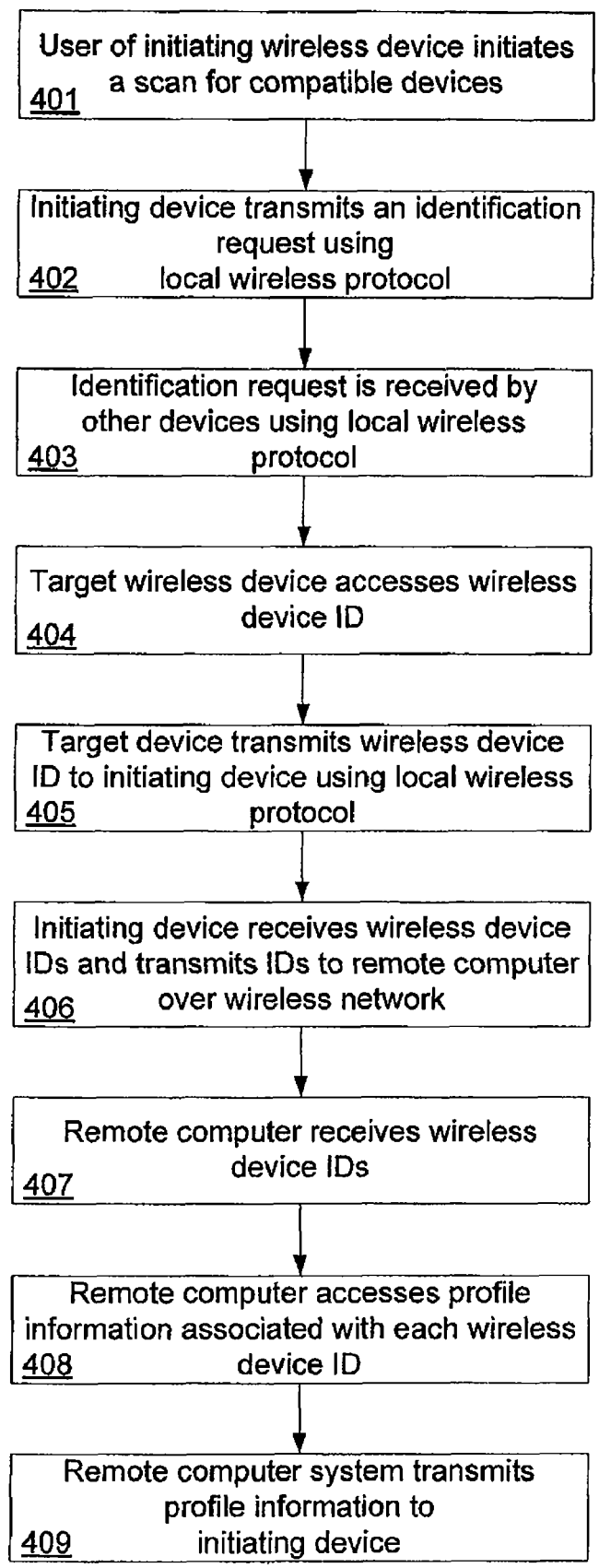
FIG. 4 illustrates a method according to one embodiment of the present invention.

FIG. 4 illustrates a communication method according to one embodiment of the present invention. Some or all of the elements of the following method may be implemented in software or hardware or as a combination of software and hardware on wireless devices. At 401, a user of an initiating wireless device (e.g., Device A of FIG. 3) initiates a scan for other wireless devices (e.g., using an "initiate scan" menu item or button on a wireless device). In one embodiment, a user may initiate a scan when in visual contact with another user, for example. At 402, the initiating device (e.g., "Device A" in FIG. 4) transmits an identification request using a local wireless protocol. At 403, the identification request is received by other wireless devices (i.e., target devices) using the wireless protocol. At 404, one or more of the target wireless devices (e.g., Device B) access their respective wireless device IDs. At 405, each target wireless device transmits the device ID to the initiating device using the local wireless protocol. At 406, the initiating device receives the wireless device IDs from the other wireless devices and transmits the device IDs to a remote computer over a wireless network. At 407, the remote computer (e.g., a server) receives the wireless device IDs. At 408, the remote computer accesses profile information associated with each wireless device ID. At 409, the remote computer transmits the profile information associated with each device ID to the initiating device.

Figure 5:
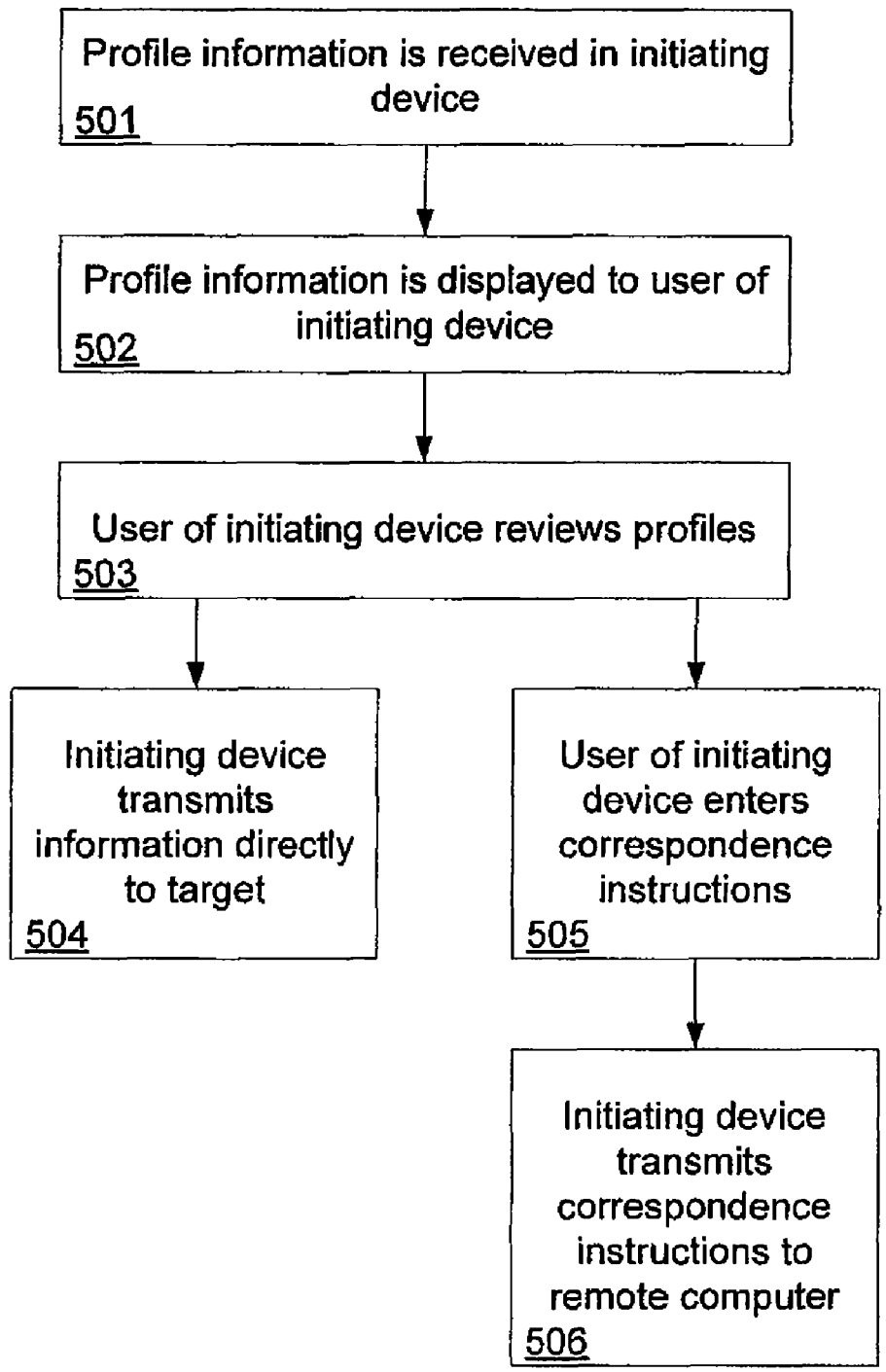
FIG. 5 further illustrates a method according to one embodiment of the present invention.

FIG. 5 further illustrates a method according to one embodiment of the present invention. At 501, profile information is received from a remote computer in the initiating device. At 502, profile information is displayed to a user of the initiating device. For example, the initiating device may first receive images or pictures of target users and display the images to the user of the initiating device. At 503, the user of the initiating device reviews the profile information (e.g., the images or pictures). At 504 the initiating device transmits information, such as a message or the initiating user's profile, directly to the target device using the local wireless protocol. Alternatively, at 505, the user of the initiating device enters correspondence instructions (e.g., a message) into the initiating device. At 506, the initiating device transmits the correspondence instructions to the remote computer.

Figure 6:
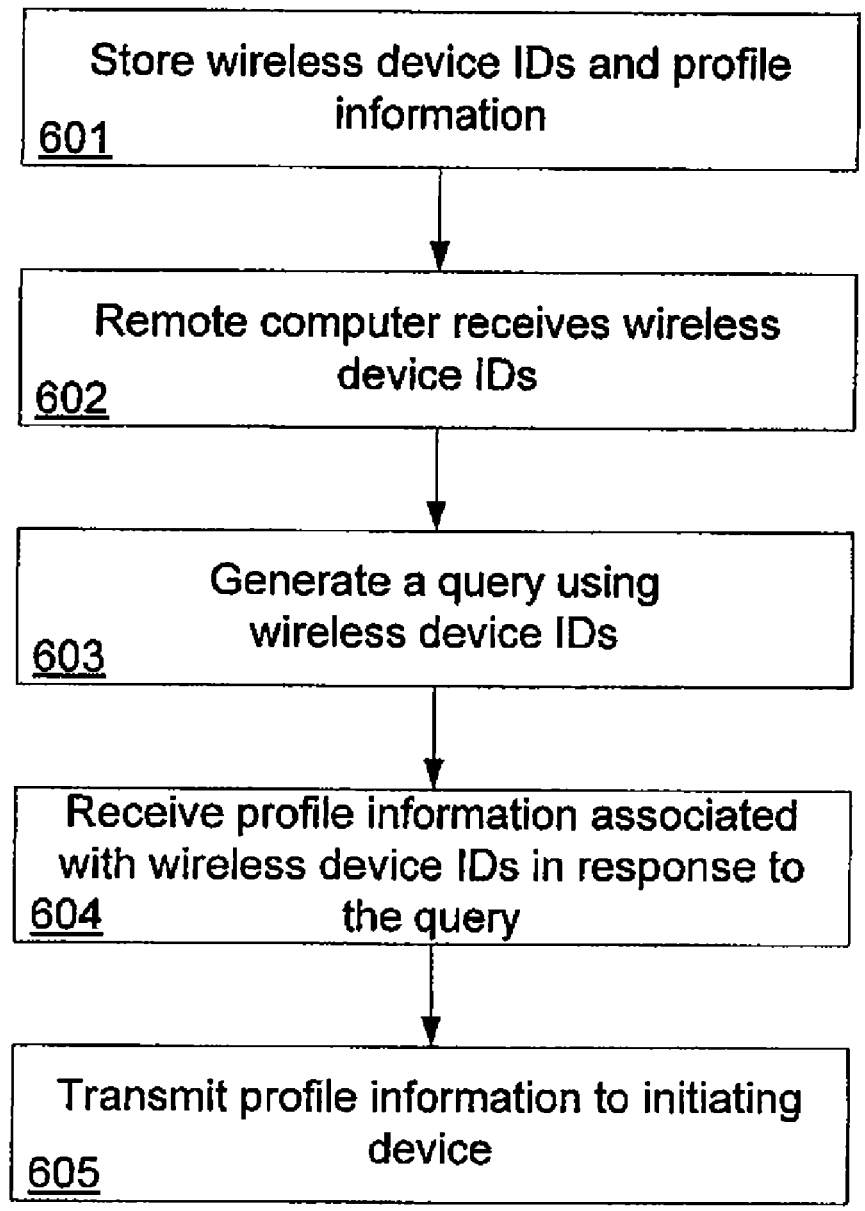
FIG. 6 illustrates a method according to yet another embodiment of the present invention.

FIG. 6 illustrates a method according to yet another embodiment of the present invention. At 601, one or more wireless device identifications and associated profile information are stored on a remote computer. At 602, the remote computer receives the wireless device IDs. At 603, software on the remote computer (e.g., a web application) generates a query using one or more of the wireless device IDs. At 604, some or all of the profile information associated with each device ID is received in response to the query. At 605, the remote computer system transmits the accessed profile information to the initiating wireless device (e.g., Device A).

Figure 7A:
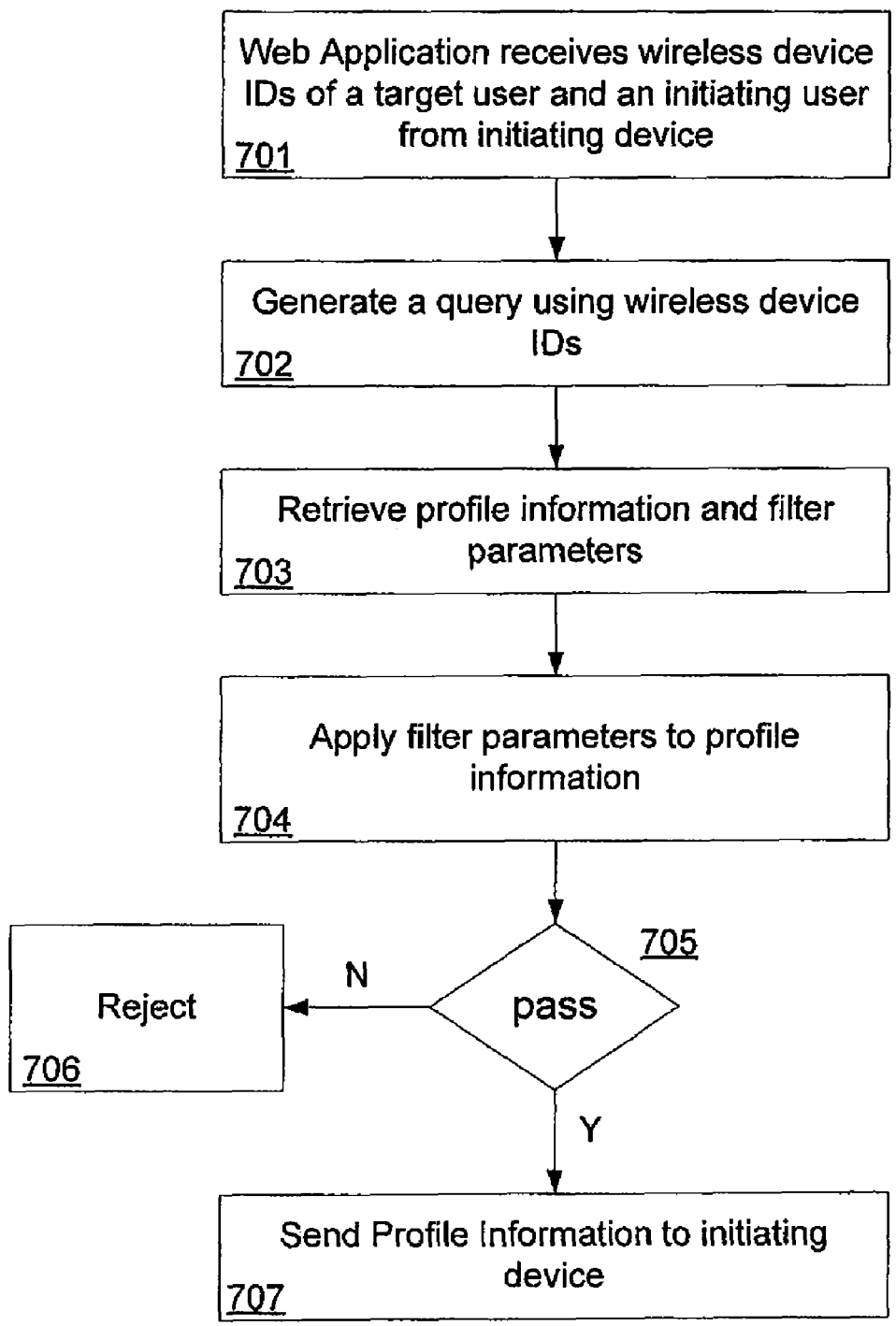
FIGS. 7A-B illustrate filtering based on profile information according to one embodiment of the present invention.
Figure 7B:
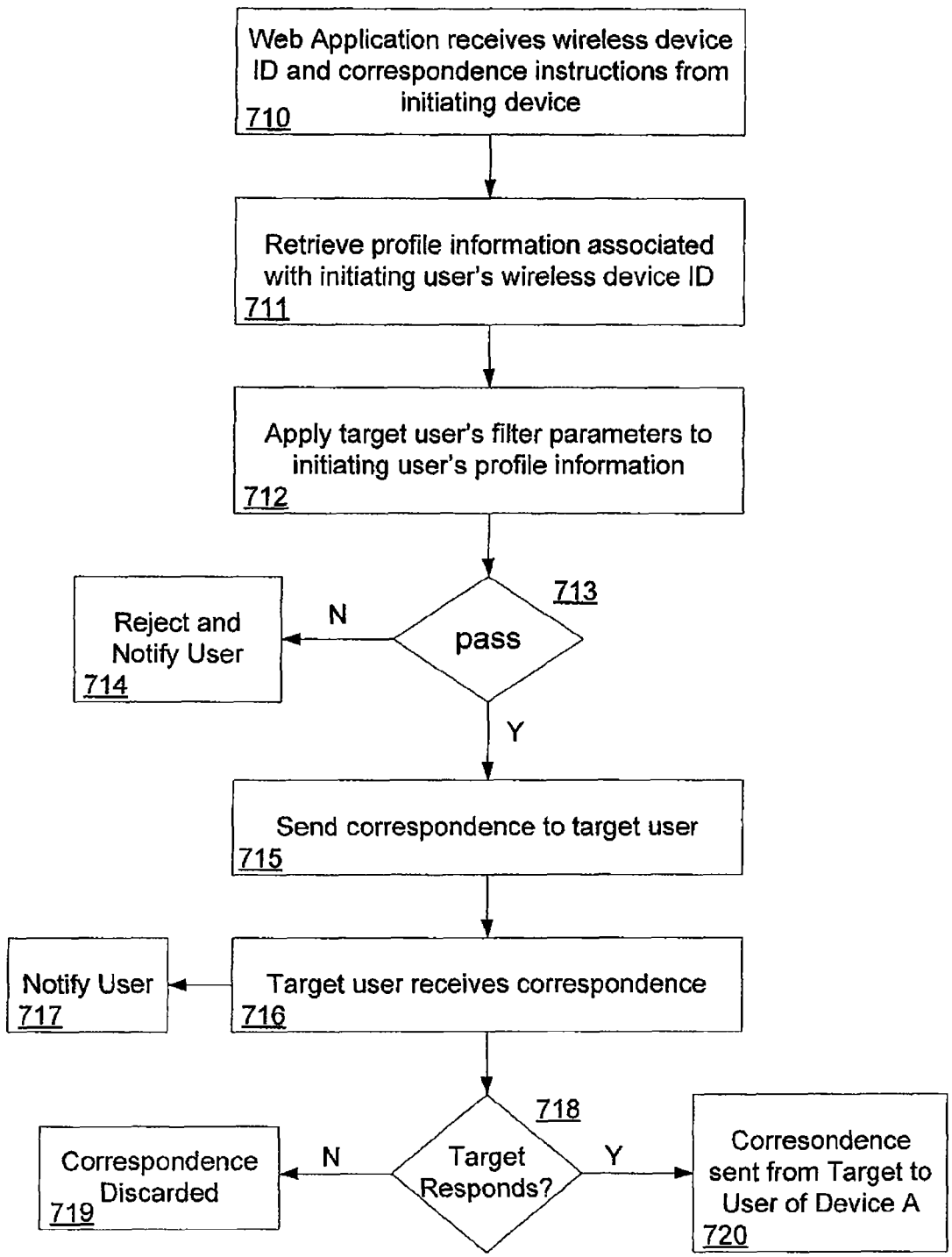

FIGS. 7A-B illustrate filtering based on profile information according to one embodiment of the present invention. As mentioned above, embodiments of the present invention allow users to send messages and profile information to other users. Some applications may use the device IDs of both the target and the initiating devices to perform filtering. For example, at 701 in FIG. 7A, a web application may receive device IDs of a target user and an initiating user from an initiating device. At 702, a query using the device IDs is generated, and at 703 profile information and filter parameters associated with the device IDs are retrieved. At 704, the filter parameters are applied to the profile information. For example, the profile information of a target may be compared to the initiator's filter parameters, and the target's profile is filtered out (e.g., if the salary is less than $10,000 per year or degree earned is not at least High School Diploma). Alternatively, the profile information of an initiating user may be compared to the target's filter parameters, and the initiating user may be denied access to the target's profile if the initiating user's profile information does not satisfy the target user's filter parameters. At 705, the system branches based on whether or not the filter parameters are satisfied. If the profile information does not pass the filter, the target profiles are rejected at 706. However, if the profile information does pass the filter, the target profiles may be sent to the initiating device at 707.

FIG. 7B illustrates another example of filtering based on profile information. Filtering may also be implemented such that access to a target user's profile information is allowed, but messages to the target are blocked if filter parameters are not satisfied. For example, after an initiating user has obtained a picture of the target user and opted to send a message to the target user, the web application may receive correspondence instructions from the initiating device at 710. The web application may also receive the device ID for the initiating device, either earlier in the process or together with the correspondence instructions. The web application may use the initiating device's ID to retrieve the initiating user's profile at 711. At 712, the system may apply filter parameters set up by the target user to the initiating user's profile information. The web application may determine whether or not the initiator's message is automatically rejected or passed at 713. Thus, a target user may automatically screen out communications from undesirable initiating users. An initiating user's message may be rejected and the initiator may be automatically notified of the rejection at 714, in which case no correspondence is sent. If the initiator passes, then the system may complete the correspondence instructions at 715, which may include sending a message directly to the target's wireless device or making a message available on the system for later retrieval. At 716 the target receives the correspondence. At 717 the initiating user may automatically be notified that the correspondence instructions have been completed or that the correspondence has been received. A target may choose to respond at 718. If the target chooses not to respond, then the correspondence may be discarded (e.g., deleted from the system) at 719. Alternatively, the target may opt to send correspondence to the user of the initiating device at 720, and thereby further interact with the initiator immediately or at any later time. Filtering as described above may be done at the granularity of the information type (i.e., information element-by-information element). In other embodiments, filtering capacity is done in an all-or-none manner.

Other Example Applications

In addition to dating applications, embodiments of the present invention may be used in a variety of other applications. In one embodiment of the present invention, Device A may be a business or advertiser that automatically queries other devices for their IDs, receives one or many responses to its request and communicates this information to the remote computer. The remote computer then compares the profiles associated with the IDs to the pre-defined preferences of User A. If any of the profiles match these preferences, an alert is sent to User A to indicate the presence of a person-of-interest. For example, a business or other organization (such as an advertiser) may take some additional action based on the presence of a person with a specific profile. An advertiser may retrieve profiles and forward advertisements to such user's accounts. User's of the service may opt to receive advertisements or filter advertisements based on predefined criteria (i.e., restaurant ads only).

Another example application of the present invention may include entertainment or other gaming applications operating on mobile devices. One player may decide to initiate or play a game with another based on the other user's profile. For example, the system may automatically enable a gaming application when other devices are detected within their vicinity, and the information associated with the local devices may indicate that the users of such devices are players of a particular game, have specific skill levels or may present some other challenge. The system may automatically notify the user of that person's presence so that a gaming scenario can begin.

An additional embodiment of the present invention includes the use of the service and/or hardware for the electronic commerce applications including micropayments. Micropayments are prepaid accounts that may be used for low dollar amount purchases. Additional embodiments of the present invention also include medical applications where a user profile may contain medical or other information that may be accessed by a doctor, pharmacist, emergency services technician or other health provider. Yet another embodiment of the present invention includes software, which can be downloaded into an existing platform to enable it to practice the present invention and perform in the techniques described herein.

Embodiments of the present invention may also include business methods for generating revenue and income through the sales of hardware, software and services using the techniques described herein. These include (a) selling software for use on existing hardware platforms to enable the invention, (b) the sale of hardware (including jewelry or other form factors described below) to enable the invention, and (c) charging users on an annual, monthly or per-message basis for use of the services described herein. These business methods also include the ability to charge users for the exchange of messages or information processed through one or many central servers based on IDs exchanged between mobile devices as described above. It is to be understood that a variety of users (i.e. senders or recipients, or both) may benefit from various applications of the present invention. Users of the devices and services may include individuals, businesses, not-for-profit organizations, advertisers, political action groups, or any other organization.

Portable Profile

In some embodiments, wireless devices 310 and 320 may include initial profile information 312 and 322 stored locally on the wireless devices. Initial profile information 312 and 322 may be pictures and/or profile summaries (i.e., "thumbnails") that require less memory than a full profile so that profiles may become "portable." Initial profile information may contain short textual statements and a picture. Initial profile information may also be customizable by a user so that each user can create their own "portable resume" in accordance with their own tastes and interests. Thus, in addition to providing their device IDs, the queried devices may also provide various forms of initial profile information, such as a picture of User B or text, so that User A can select other users to communication with from the available users on the local network. For example, in one embodiment, initial profile information such as an image or text is received with the device IDs directly from the other wireless devices. Device A may then display the initial profile information (e.g., a picture) to User A using a display or other interface. User A may then select specific target devices for further and subsequent queries. Thus, rather than automatically retrieving profile information for all device IDs within range, computing resources may be saved by narrowing the list to profiles of interest to be retrieved from the remote computer system.

Example Implementation Using Bluetooth

Figure 8:
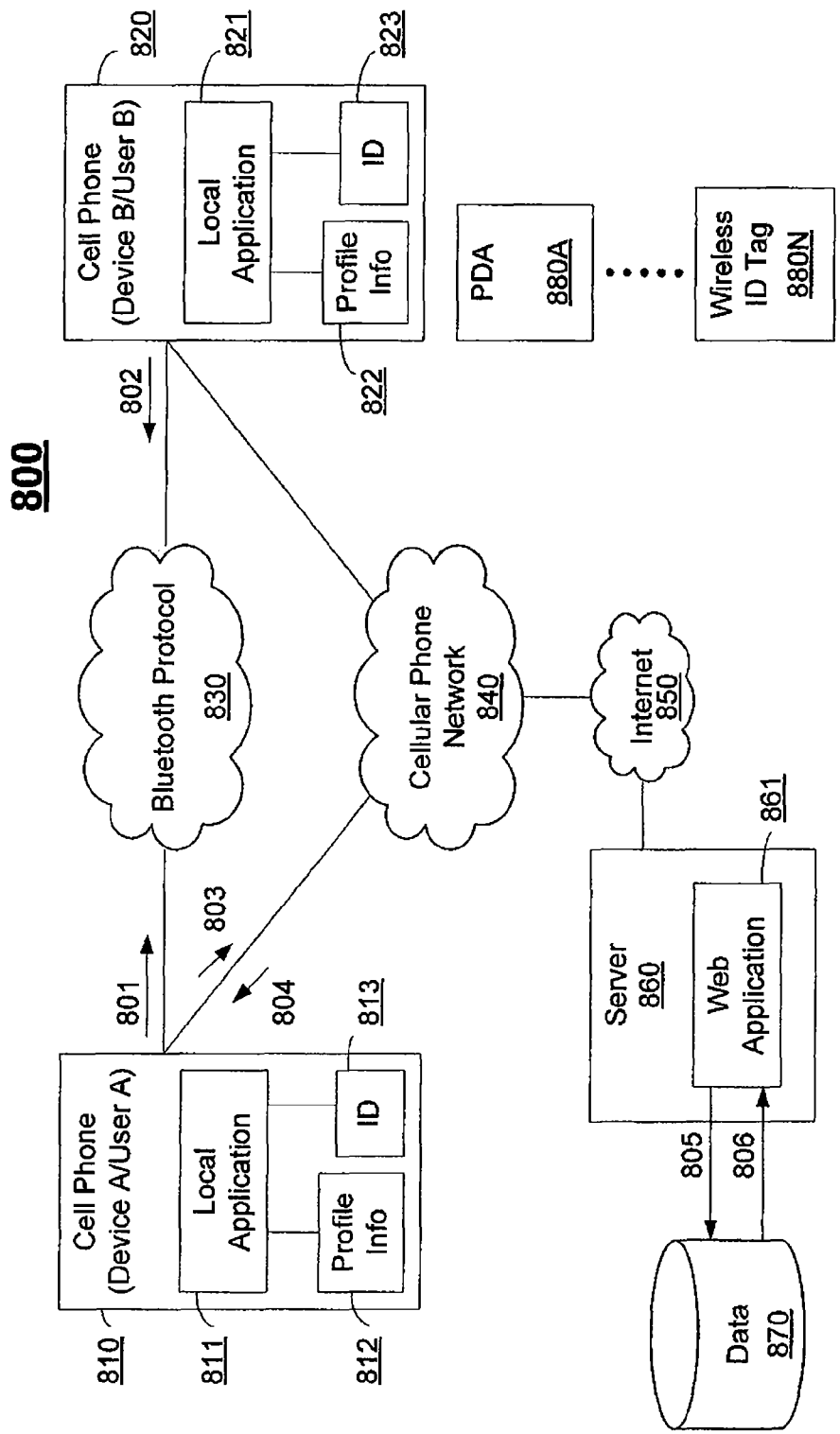
FIG. 8 is an example of a system according to another embodiment of the present invention.

FIG. 8 is an example of a system according to another embodiment of the present invention. System 800 includes cellular phones 810 and 820 and other wireless devices such as PDA 880A and wireless ID tag 880N all capable of communicating using a Bluetooth Protocol 830. When User A initiates an identification request 801, other wireless devices send replies 802 that include wireless device IDs 823 and optional initial profile information 822 if profile information is stored on the devices. In this example, a request (i.e., a query) 801 and reply 802 are made using Bluetooth.

In one embodiment, the wireless device IDs 813 and 823 are unique identifications. If a unique ID is stored in the wireless device, a local application may be included for retrieving the unique ID. One example unique ID is shown in system 800, wherein the unique identifications are Bluetooth IDs (e.g., IDs 813 and 823). In other embodiments, the unique ID may be an RFID or another equivalent identification for uniquely identifying the wireless device. Another example of a unique identification is a unique identification number assigned to a communication device by the device manufacturer. A device manufacturer, in coordination with the other device manufacturers, may have policies for assigning such unique IDs such that each communication device is provided with a unique ID in the manufacturing process. In some applications, unique IDs, once assigned, are often never changed or reused. A unique ID can then be used to uniquely identify a given device with a common communication network shared by all communication devices.

Upon receiving reply 802, Device A sends a request 803 to web application 861 on server 860. Device A may communicate with web application 861 in various ways. In one embodiment, Device A contacts web application 861 using standard web technologies such as HTTP protocol over a cellular network. In yet other embodiments, Device A may be Internet-ready, using Bluetooth, or different Wi-Fi technologies (e.g., 802.11) to contact web application 861 using web technologies such as HTTP protocol over the Internet. In other embodiments, Device A may contact web application 861 through an intermediate Internet-ready relaying computer (e.g., a USB cable, cradle or other physical connection). Device A may attach devices IDs received in replies 802, and may further attach its own device ID and either the content of a message or a link to a pre-constructed message for use by the web application 861 and database 870.

In one specific embodiment, a query request 805 is generated to database 870 when web application 861 receives request 803. Query request 805 includes one or more wireless device IDs received in request 803. Request 805 may also contain information about what particular information should be contained in reply 806. For example, a request 805 may include the device ID of Device A, the device ID of Device B and a message or link to a message or other information. Request 805 is then sent to database 870 for retrieval of information and processing of information.

In response to request 805, database 870 generates a reply 806, which typically will include profile information associated with the device IDs supplied in request 805. The profile information returned in reply 806 depends in part on how User B has configured his/her profile information. For example, User B may store some information that is designated non-public (i.e., information that may not be disclosed in response to a request 805), and may store other information that may be designated public (i.e., information may be disclosed in response to a request 805). Database 870 may differentiate public information from non-public information. Thus, non-public information may be filtered out when generating reply 806. For example, the true identity of User B may be stored in the database 870 and designated non-public (e.g., when the user signs up for the service). Therefore, a particular request 805 may only return public profile information while filtering out any information pertaining to a user's true identity.

Upon the reception of reply 806, the web application 861 formats User B's profile information and constructs reply 804, which is sent back to Device A through cellular network 840. In some embodiments, reply 804 is formatted according to industrial standard data sharing language such as XML. However, reply 804 may be constructed using a proprietary format or template. In some embodiments, each of the request 801, reply 802, request 803, request 805, reply 806 and reply 804 are transferred in an encrypted format. In such case, the senders of these requests and replies may include additional software code that encrypts the transmitted data, and the recipients of these requests and replies come with software code for decrypting the received data. In some embodiments, different kinds of encryption and decryption technologies are used in the said requests and replies. In such cases, the sender and recipient of a given request or reply may communication in the same protocol, encryption and decryption language.

Upon the reception of reply 804, Device A processes reply 804 by decoding the information content and formatting the received information content for display to User A. In some embodiments, a summary of the received information is constructed while processing reply 804. Such summary information may be a picture of the targeted user or a short summary description of each targeted user (e.g., 820 and 880A-N). The picture or other information may then be displayed to User A through a graphical user interface on a display, and the user may select a target user based on the picture before other information is presented. In one embodiment, a first reply 804 includes only pictures and optionally a short summary of the target user's profile. Additional profile information may be retrieved from the server only if the initiating user selects a particular target user based on the picture and initial information.

In some embodiments, multiple requests and replies corresponding to different targeted users may be concurrently processed by server 860. For example, while web application 861 is in the process of obtaining information for a particular user (e.g., the user of Device 880A) and waiting for database 870 to deliver a reply 806, Device A can initiate another request 803' to the web application 861 for another user (e.g., the user of Device 880N). In some embodiments, multiple requests and replies of the same type are packaged together in a single request or reply for performance optimization or bandwidth optimization purposes. In yet other embodiments, Device A waits for a configurable amount of time (e.g., 5 seconds) before it processes all the replies 804.

Messaging

As mentioned above, embodiments of the present invention may include parameters and algorithms used to control message delivery. As illustrated above with reference to FIG. 7A-B, message delivery may be configured to be contingent on a number of pre-set conditions including but not limited to whether User B has configured the system to allow reception of messages from someone with profile information of User A. Additionally, users may configure the system to control the form of the message received, the number of messages received in given time interval, the maximum number of messages or other filtering preferences for filtering out unwanted, repetitive, overwhelming or otherwise undesirable messages (e.g., spam). Additionally, a targeted user can specify a location, method or format for receiving a message. For example, users may specify that messages are to be sent to email, to a cellular phone message system or to any other designated target. Similarly, a user may specify that messages are to be received an email message, a text message, an instant message or as voicemail, for example, with or without multimedia attachments. Additionally, delivery locations or formats may be contingent upon the types of message or on the source of the message. For example, User B can specify to receive an immediate text-messaging alert when a particular user (e.g., User A) has sent User B a message. For another example, User B can specify that messages matching a certain specified criteria are to be received in a particular email inbox location. User B may specify that messages matching other specified criteria are to be received in another location, such as another email box.

Users may also access messages in a variety of ways. For instance, web application 861 may include a message management interface, and users may receive messages by logging on to web application 861 and accessing the message management interface. In another embodiment, accessing messages may involve receiving and displaying the messages on the user's wireless device. Message delivery may further include notification techniques. For example, User A may receive a notification after a message is delivered to User B or when the message is read by User B (e.g., by an email notification or by examining the properties of the sent message).

When a target user has received a message from an initiating user, the target user may also respond to the received message through web application 861 or respond to the received message directly over the wireless network from Device B to Device A. In other embodiments, User A is given choice of staying anonymous throughout the process. For subsequent messaging after the initial message, User B is also given a choice of staying anonymous in subsequent interactions.

Device A may further contact web application 861 to log when a message is sent or received. A send and/or receive log may be stored in database 870, for example. Such send and receive messaging logs can be accessed by users at a later time by accessing web application 861. Furthermore, web application 861 may automatically log some or all of the previously targeted wireless devices for the user of the initiating device and log the profiles viewed by User A.

Broadcast Mode

In another embodiment of the present invention, an initiating wireless device (e.g., Device A) automatically transmits identification request queries to targeted devices 820 and 880A-N (i.e., operates in a broadcast mode). In some embodiments, such queries are transmitted in a broadcasting manner to other devices operating in physical proximity. Due to power limitations of wireless devices, this may be done in a periodic manner, and users may specify the frequency of transmitting or broadcasting these requests. A target wireless device operating in physical proximity will receive the request for its device ID. If the target wireless device is out of range, the target device may continue to operate in a listening mode. If a request is received, then the target device broadcasts or sends its device ID to the initiating device. In one embodiment, the initiating device may periodically check if a reply has been received. If not, it continues to automatically transmit an identification request, and is ready to receive a reply. In some embodiments, the user of an initiating device can specify the number of retries to be done, or a duration of time such probing is done, and if the number of retries or the specified duration of time has elapsed without receiving any reply, the operation may be terminated. It is to be understood that embodiments of the present invention may include initiating devices that operate in a listening mode, whereby target devices periodically transmit their device IDs and the initiating devices receives the devices IDs for further processing as described above.

Thus, the initiating device may periodically receive one or more responses to its automatically generated identification request, and subsequently communicate the target device IDs to web application 861. In some embodiments, such communication includes the device ID of the initiating device to web application 861. Web application 861 then retrieves information and configuration parameters, and filters the obtained information according to the preferences of the initiating device and target device, and returns the filtered information back to the initiating device for display. Some or all of these steps may also occur automatically so that the user of a device may be presented with an automated prompt indicating the a communication has occurred with another user in the vicinity.

Extended Range Operation

Figure 9:
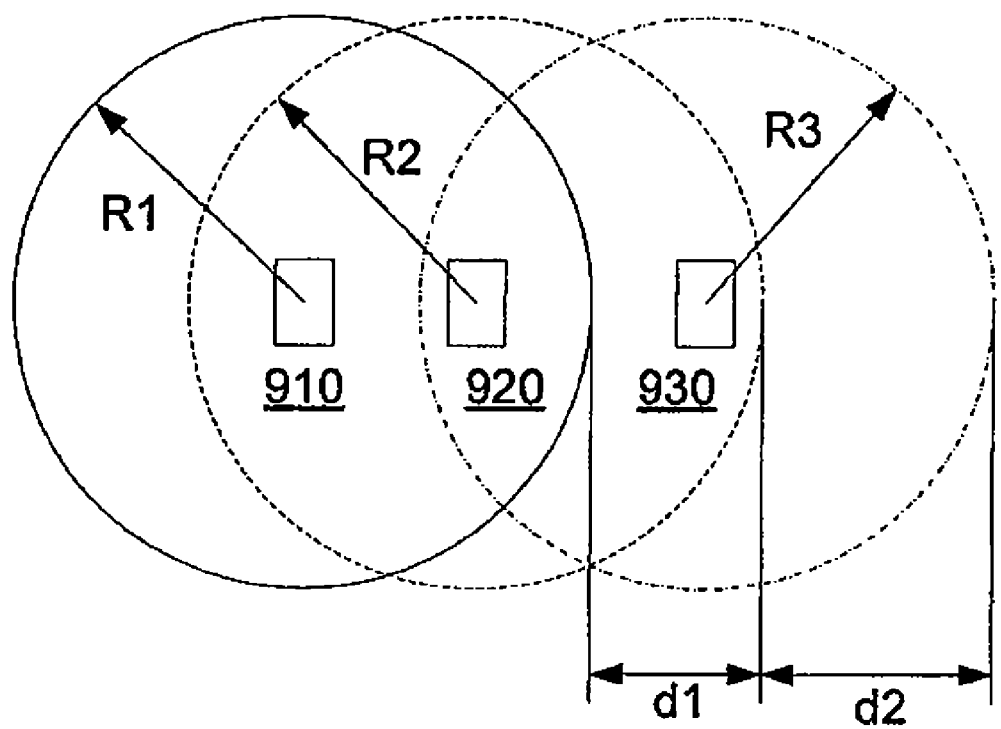
FIG. 9 is an example of extended range operation according to another embodiment of the present invention.

FIG. 9 is an example of extended range operation according to another embodiment of the present invention. As shown in FIG. 9, the effective range of a communication may be extended beyond the effective range of a given local wireless protocol. In FIG. 9, wireless devices 910, 920 and 930 each show the location of a wireless device. Each circle represents the effective range of the local wireless protocol, such as Bluetooth, used by each of the devices for detecting other devices. For devices to detect or communicate with each other, each device must be within the range of the other device. For example, device 910 and device 920 are capable of communicating with each other, and device 920 may communicate with device 930. However, device 910 may not detect or communicate with device 930 because both devices are out of range. In one embodiment, a target device, in response to a device ID request from an initiating device, returns its own device ID together with the device IDs of all wireless devices within the target's range. For example, in one embodiment a target may receive a wireless ID request from an initiating device and automatically issues its own wireless ID request. In response to the wireless ID request of the target, other wireless devices within the targets range may send the target their device IDs. The target may subsequently return both its own device ID to the initiating device and the device IDs returned to the target by the target's subsequent wireless ID request. Thus, the initiating device will detect not only the target device ID, but also other device IDs for wireless devices within the target's range. Such wireless devices may be outside the range of the initiating device. Communicating with devices outside the range of the initiating device extends the effective range of the device. In FIG. 9, the effective range of device 910 is increased by a distance "d1" using information from device 920. The range may be further increased by a distance "d2" using information from device 930. Each extension may be referred to as a "hop" across devices using a local wireless protocol. The maximum number of hops may be configured by a user to limit the effective range. For example, messages to other users may be discarded if they are forwarded more than a configured number of hops.

Figure 10:
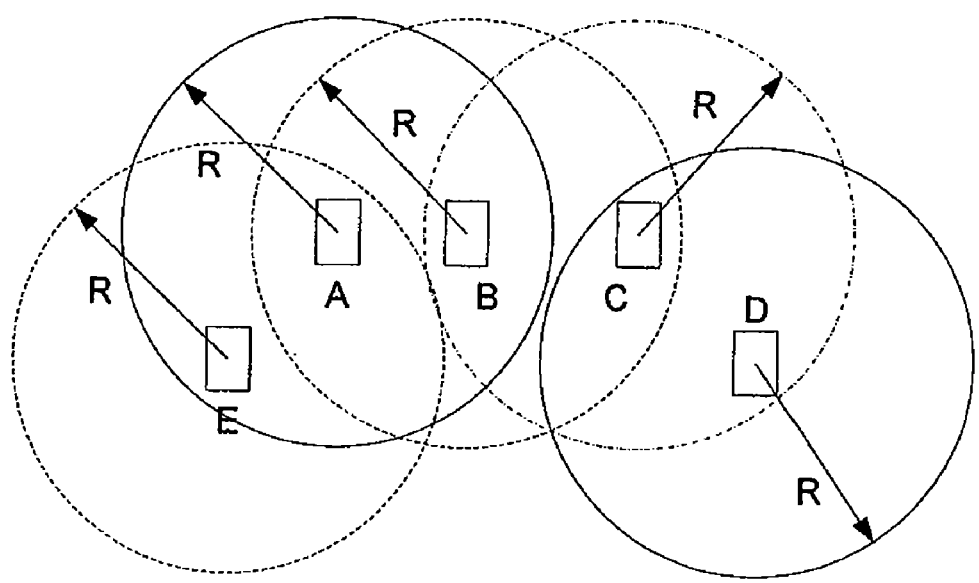
FIG. 10 illustrates a positional database used to extend the range of communication according to one embodiment of the present invention.

FIG. 10 illustrates a positional database used to extend the range of communication according to another embodiment of the present invention. In this embodiment, the presence of neighboring devices are established via a local wireless protocol, their IDs uploaded to a central server via a cellular or other network and such information is used to create a positional database. For example, from the diagram in FIG. 10 it can be seen that device A is within range of devices B and E. Thus, if device A issues an identification request, it will receive device IDs from devices B and E. This positional information may be captured in positional database 1000, which may include a field (e.g., a column) designating the "Device" and another field designating "Devices in Range" of the associated "Device." Since devices B and E are within range of device A, devices B and E are entered in the second field of positional database 1000 in the row associated to device A. Similarly, devices A and C are entered in the second field of positional database 1000 in the row associated with device B. Likewise, devices B and D are associated with device C, device C is associated with device D and device A is associated with device E. Therefore, when device A initiates an identification request, devices B and E return their device IDs, which are subsequently sent to the remote computer. The remote computer can use the device IDs for devices B and E to return information for these devices. However, using the positional database 1000, the remote computer can further determine that device C is in range of device B. If the system is programmed to return all users active within one hop, the system may automatically use device C's ID and return information associated with device C's ID to device A. The remote computer can further determine that device D is in range of device C. If the system is programmed to return all users active within two hops, the system may automatically use device C's ID and device D's ID and return information associated with both device IDs to device A. Positional database 1000 may be updated by periodic identification requests. Therefore, upon request of Device A, the remote computer will supplement direct responses (in this case, from device B and device E) with indirect responses (in this case, "C" and "D") that User A can select from. By correlating this location information, the system can create what is effectively an expanded or "daisy-chained" network, dramatically increasing the utility and range of the system. In one embodiment, individual users or the system itself can set limitations such that users removed from direct contact beyond a certain number of hops (e.g. more than twice removed) are not included in any query.

Example Interfaces

Figure 11:
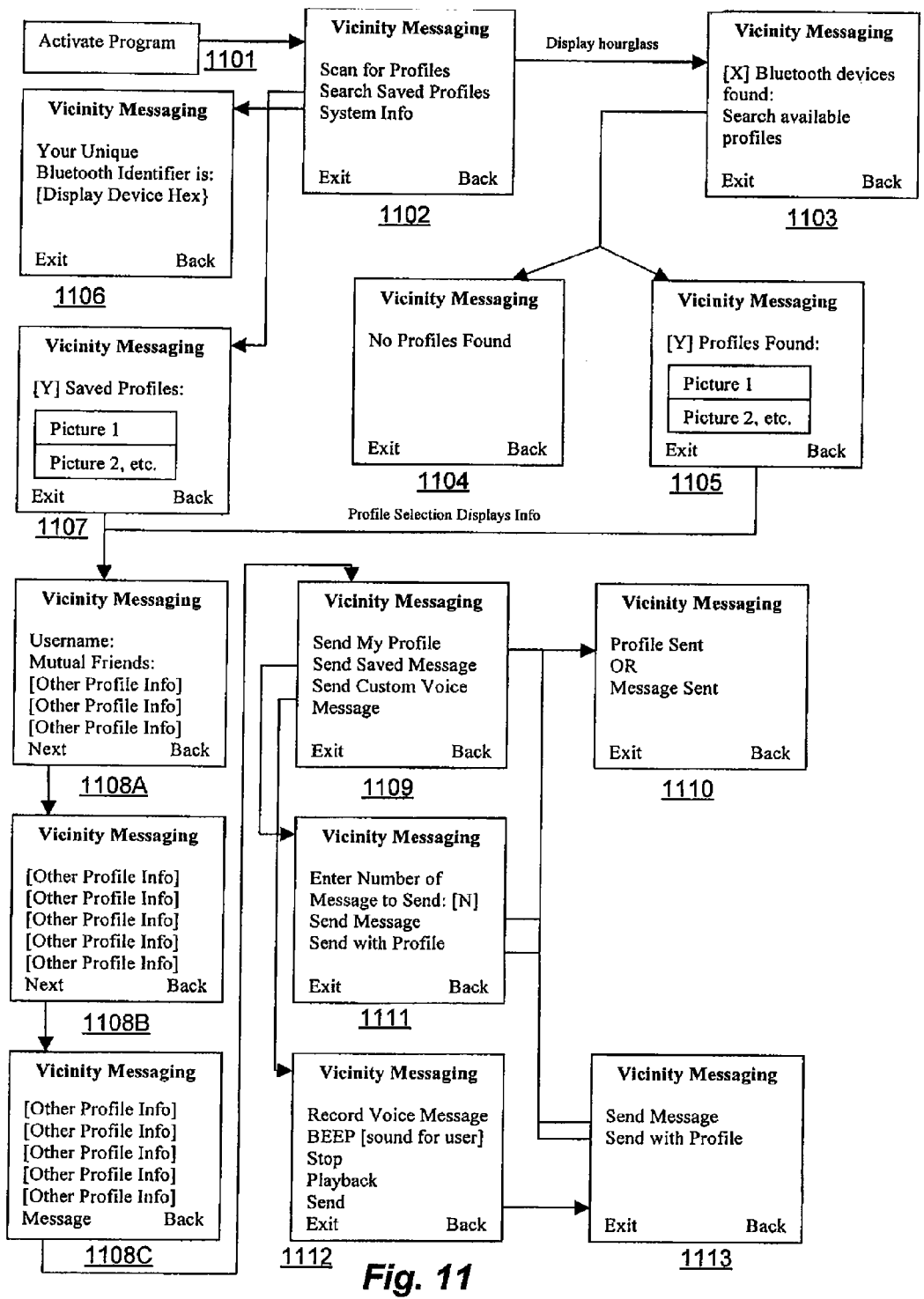
FIG. 11 is an example of a wireless device interface according to another embodiment of the present invention.

FIG. 11 is an example of a wireless device interface according to another embodiment of the present invention. The steps in FIG. 11 may be executed on a wireless device by a local application, which may display some or all of the steps in FIG. 11 to a user on a display, for example. At 1101, the application program is activated. At 1102, a user may scan for profiles in the vicinity (e.g., by transmitting a identification request), search for saved profiles or obtain system information. If the user opts to scan for profiles, the number of devices that respond (e.g., [X] Bluetooth devices) may be obtained at 1103. A user may search available profiles, which may be pictures, initial profiles (i.e., summary or "portable profiles") or complete profiles retrieved from a backend system such as an Internet server. If no devices are in range, then the system may display "no profiles found" at 1104. The system may display a list of profiles (e.g., a picture and short text segment or heading) on the wireless device for the user to review and select at 1105. If a user is interested in a listed profile, the user may select the profile to view the complete profile. Complete profiles are displayed to a user at 1108A-C. The system may display a list of previously saved profiles at 1107, from which a user may select the complete profile and obtain profiles 1108A-C. Profiles 1108A-B may include information as shown in FIGS. 3C-D above and may include links to a user's "Blogs" (i.e., weblog) as well as any items or services for sale. At 1109, a user may respond to a profile of interest by sending his/her own profile, a saved message or a custom message (e.g., a custom voice or text message). At 1110, the system sends the profile or message and displays the action to the user. At 1111, the system may prompt the user for the number of a message to send (i.e., if saved messages have associated numbers). The system may also allow a user to select a message and send the message with the user's profile. At 1112, a user may record a voice message. A user interface may include menu items for Recording, Stopping, Playback and Sending the recorded message. At 1113, the user may confirm that the message is complete and ready to send with or without the user's profile.

Embodiments of the present invention may also include software that allows a user of a wireless device to directly access the wireless device identification through a menu. For example, software menu item 1106 may allow a user to display a unique identification (e.g., a Bluetooth ID) on the screen of the display. A local application may load the device ID from an internal memory location or register into a software variable, and subsequently display the device ID to the user. Once the device ID has been loaded from memory into software, the device ID may be transformed into a variety of different formats (e.g., HEX, Text, ASCII, etc.).

Figure 12:
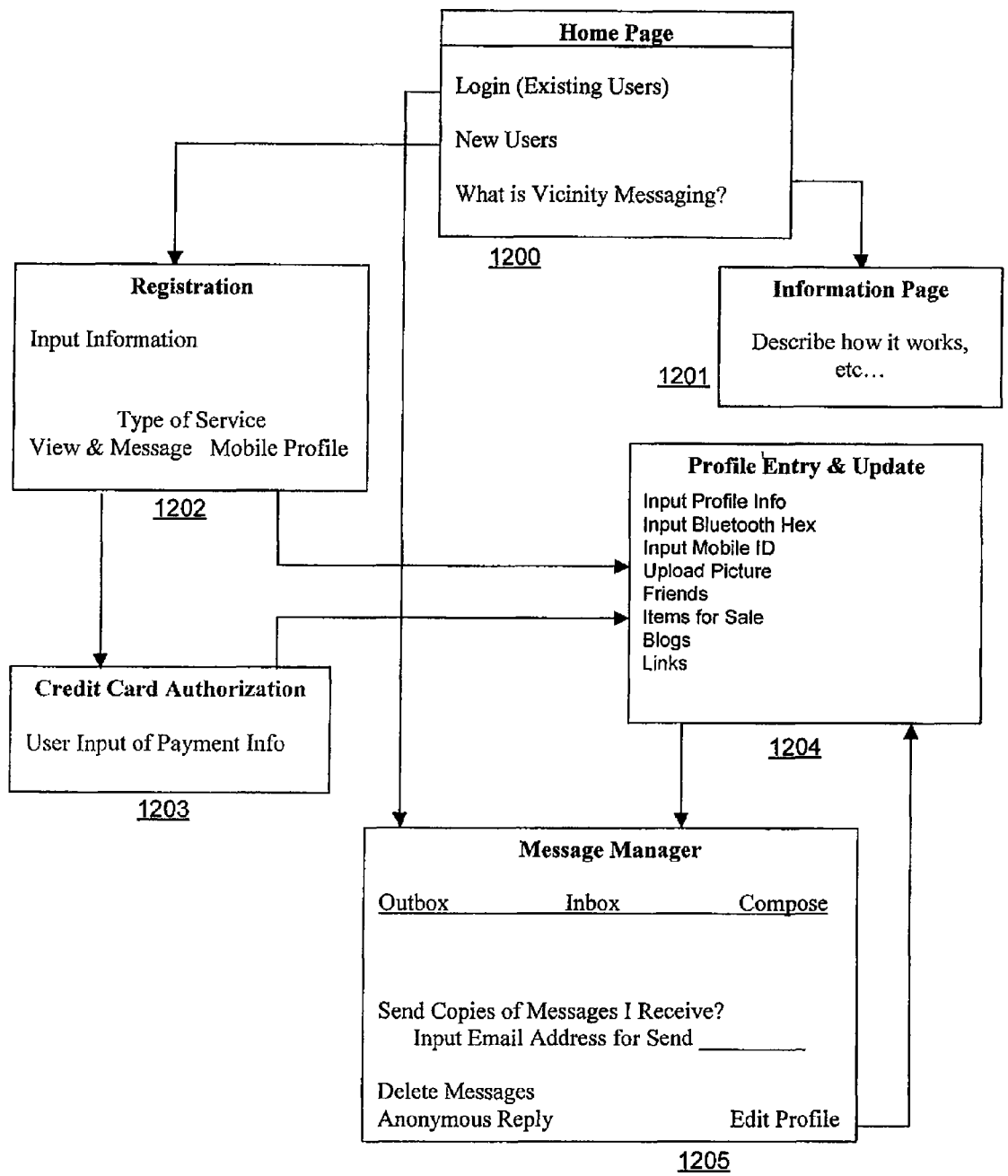
FIG. 12 is an example of an application interface according to another embodiment of the present invention.

FIG. 12 is an example of an application interface according to another embodiment of the present invention. The steps in FIG. 12 may be executed on a computer system such as a server by a web application, which may display some or all of the steps in FIG. 12 to a user on a display, for example. At 1200, a user may access the home page over the Internet. The home page may allow a user to login, sign up as a new user or gather information about the system (e.g., "What is Vicinity Messaging"). Information about the system may be displayed to a user at 1201. At 1202, the user may access the service either as an existing user or new user. If the user is a new user, then he/she registers by entering his/her payment information (if applicable) such as credit card information. Payment authorization for the service occurs at 1203. At 1204, a new user may enter user profile information, configuration parameters (e.g., preferences) and other relevant information (e.g., device ID or other Mobile ID) and may even upload information (e.g., pictures) from a desktop computer, wireless device or any other source. The profile information, configuration parameters, associated device IDs and other information may be stored in a database, for example. User's may also enter information about friends, items for sale, Blogs and links to other information on the Internet. Embodiments of the present invention may include a message manager as shown at 1205. Message manager may include an "Outbox," "Inbox," and "Compose" features. As mentioned previously, messages may be sent anonymously or with real personal information about the user (e.g., the user's real name and/or phone number).

Example Wireless Devices and Wireless ID Tags

FIG. 13 is an example of a wireless device according an embodiment of the present invention. Wireless device 1300 may act as both an initiating and target device. Wireless device 1300 includes an antenna 1301 for receiving and transmitting wireless signals, such as RF signals. Antenna 1301 is coupled to RF circuitry 1302. RF circuitry 1302 receives, transmits and processes the RF signals and may code and decode information, such as device identification requests and replies and other wireless communications describe herein as they are being transmitted and received. RF circuitry 1302 may include analog and digital circuits for implementing multiple wireless technologies such as a local wireless protocol (e.g., Bluetooth, 802.11 or Zigbee) and a wireless phone technology (e.g., an analog or digital cellular technology, CDMA, PCS or GSM). RF circuitry may also include the wireless device ID 1311. Information is processed and controlled by processor 1303. Processor 1303 may be coupled to memory 1304 and user interface 1305. Processor 1303 may execute instructions for controlling the flow and processing of information between RF circuitry, 1302, memory 1304 and user interface 1305. Memory 1304 may include one or more volatile and/or non-volatile memories, registers, and other electrical components for storing information, which are represented here as a single component for illustrative purposes. Memory 1304 may store local application 1312 and, optionally, profile information 1313. Processor 1303 may access and execute local application 1312 during "run-time" to execute the wireless device portions of the methods and processes described herein. Embodiments of wireless devices 1300 may include wireless phones, personal digital assistants ("PDA"), laptops, portable music players, portable game players, pagers, wireless email or messaging systems, pocket PC or any other mobile wireless device. Exemplary embodiments may have form factors small enough to fit in the palm of a person's hand (i.e., handheld devices) or be small enough to fit in a purse, pocket or small carrying case. It is to be understood that a variety of combinations of weights and dimensions could be used.

FIG. 14A is an example of a wireless identification tag ("ID tag") device according to another embodiment of the present invention. Embodiments of the present invention may include a wireless ID tag 1400A that may be used to carry a device ID 1405 so that other users may receive the device ID and gather information about the user of wireless ID tag 1400A. Thus, wireless ID tag 1400A is a target device only. The purpose of wireless ID tag 1400A is to provide a stored wireless device ID to other device in the vicinity (e.g., in response to an identification request), and it may not include all the components necessary for being a full featured initiating wireless device as described above. For example, an ID tag may be isolated from a user so that the device cannot receive any information from, or provide information to, a user. Thus, an ID tag may not include any user inputs or outputs such as a display, a touch screen or buttons, and may not include a local application that controls profile information and other features described above. An ID tag also may not have stored profiles of any kind. However, an ID tag does include a device ID, and may include the portable profile of the user. In one embodiment, ID tag 1400A may only include an antenna 1401, isolated RF circuitry 1402 for establishing wireless communication links described above, a device ID 1406 and power supply 1403. The device ID may be transmitted automatically on a periodic basis or in response to receiving an identification request. Power supply 1403 may include an "on/off" switch and an input for recharging an internal battery. However, all the other circuits other than the power supply are isolated from the user (i.e., all circuitry other than the power supply is isolated from direct user inputs and outputs). Thus, the wireless ID tag only receives and sends device IDs and other communication information through antenna 1401. Consequently, all inputs and outputs of the RF circuitry are received through antenna 1401.

FIG. 14B is another example of a wireless ID tag according to another embodiment of the present invention. Wireless ID tag 1400B may only include an antenna 1401, isolated RF circuitry 1402 for establishing wireless communication, a processor such as a microcontroller, a memory 1405 for storing device ID 1406 and power supply 1403. Similar to ID tag 1400A, the power supply 1403 in ID tag 1400B may include an "on/off" switch and an input for recharging an internal battery. However, all circuitry other than the power supply is isolated from direct user inputs and outputs. Thus, like ID tag 1400A, ID tag 1400B only receives and sends device IDs and other communication information through antenna 1401. Consequently, all inputs and outputs of the RF circuitry are received through antenna 1401. The advantage of wireless ID tags 1400A-B is that the reduced circuitry allows such devices to fit into a very small form factor that may allow integration of the device into jewelry, watches, and other wearable or otherwise mobile objects. For example, the wireless ID tag may be entirely embedded in a watch, a broach, a pendant, a necklace, a ring, an earring, an article of clothing, a clothing label, a wallet or a key-chain such that all internal circuits other than the power supply (i.e., on/off and recharge) are entirely isolated from any direct inputs or outputs by a local user wearing the ID tag. The ID tag may also be integrated into a credit-card form-factor or into clothing itself or as some other fashion statement which can be both aesthetically pleasing and alert others that a person is part of the messaging network described above.

Embodiments of the present invention may include wireless devices with only the discrete functionality of devices 1300 or 1400A-B. Alternatively, some or all of the features and functions described herein may be integrated with other components with additional features and functions. Features and functions described herein may be implemented through hardware implementations, as software applications or as combinations of software and hardware. In some embodiments, the devices may have the functionality to act as both initiating and target devices, and the devices operate in a symmetrical manner. In other embodiments, a device may be configured to operate as an initiating device only or as a target device only. For example, if a wireless ID tag is used, the device ID discovery phase may work asymmetrically, with a device of type similar to device 1300 being an initiating device and a device of type similar to device 1400A-B being a target device.

GPS

Figure 15:
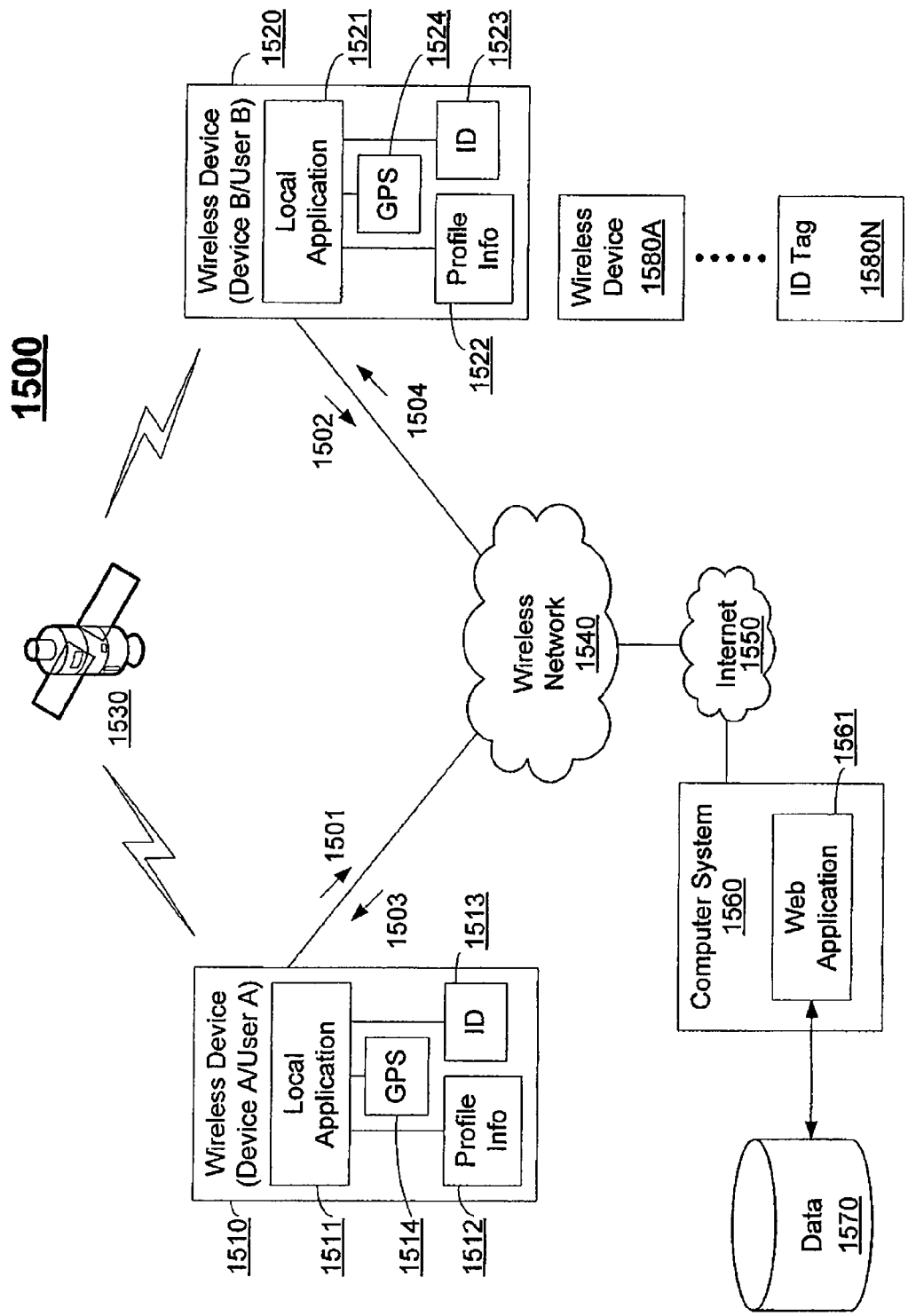
FIG. 15 is an example of a system according to another embodiment of the present invention.

FIG. 15 is an example of a system according to another embodiment of the present invention. In this example, GPS information is used for determining target devices operating in physical proximity to an initiating device. Wireless devices 1510 and 1520 may each include GPS units 1514 and 1524, respectively. GPS units 1514 and 1524 may receive signals from satellites 1530 to determine the position of the wireless devices. Local applications 1511 and 1521 may transmit the position information and wireless device IDs 1513 and 1523, which may be a phone number or other unique identifier, over wireless network 1540 and Internet 1550 to computer system 1560. Such information may be sent as position updates 1501 and 1502 either periodically or in response to a command from a user. The position information and device IDs for a plurality of wireless devices 1510, 1520 and 1580A-N may then be stored and processed for facilitating communication between users.

For example, web application 1561 may receive the position information and device IDs and store the information in database 1570. When User A decides to access information about another user (e.g., User B), User A may initiate a request on Device A to computer system 1560. The request is received by web application 1561, and may asks for a list of wireless devices that are operating within a specified range of Device A. Web application 1561 determines Device A's GPS information. Web application 1561 also generates a list of devices that are operating within a specified range of Device A by processing the GPS information for Device A and the other devices. If there is no such device, web application 1561 generates a reply to Device A indicating that there is no user operating a device within the specified range. Otherwise, if at least one device is found, web application 1561 transmits a notification 1503 to Device A. Such reply may include profile information (e.g., pictures) about each device within range of Device A. For example, web application 1561 may also sends summary profile information, such as visual cue (e.g., an image of the users of the detected devices). Device A may then display pictures of other users on a display. User A determines from the information provided by Device A whether he/she would like to carry out further interaction with any of the listed users using any of the aforementioned methods and mechanisms described herein.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Additionally, embodiments of the present invention may cover the operation of a wireless device, including software algorithms performed on a wireless device, or the operation of a computer system, including software algorithms performed on a server, database or other computer network configuration for implementing backend processing. Based on the above disclosure and the following claims, other arrangements, embodiments, implementations and equivalents will be evident to those skilled in the art.

What is claimed is:

1. A method comprising:
communicating, via a server, a request for position information of a first device;
receiving, at the server, the position information and a device ID of the first device;
storing the position information and device ID in a database;
receiving, at the server, profile information associated with a user of the first device in response to said request;
storing the profile information in the database, said storage associated with stored the position information and device ID;
receiving, at the server, a request from a second device for the position information, device ID of the first device and the profile information associated with the user of the first device;
determining, via the server, if the position information of the first device is within a proximity of the second device; and
if the first device is within the proximity, transmitting a notification to the second device.

2. The method of claim 1, further comprising:
if the first device is not within the proximity, transmitting a message to the second device indicating that the first device is not within the proximity.

3. The method of claim 1, further comprising:
based on the profile information, determining whether the user of the first device and the user of the second device have a relationship.

4. The method of claim 3, further comprising:
determining a degree of relationship between the user of the first device and the user of the second device.

5. The method of claim 4, further comprising:
based on a degree of relationship, incorporating the position information and profile information of the user of the first device in a user profile of the user of the second device.

6. The method of claim 1, wherein the proximity is preset by the server.

7. The method of claim 1, wherein the proximity is preset by the first device.

8. The method of claim 1, wherein the proximity is preset by the second device.

9. The method of claim 1, further comprising:
in response to said request, receiving at the server a second request from the first device for position information of a third device, the request extending to other devices within a proximity of the first device;
receiving the position information and device ID of the third device; and
storing the position information and device ID of the third device in the database.

10. The method of claim 9, further comprising:
if the first device is not within the proximity, correlating the position information for the third device with the position information of the first device to create an expanded range of devices.

11. The method of claim 10, further comprising:
transmitting a second notification to the second device second device identifying the third device based on the expanded range.

12. The method of claim 11, wherein the second notification identifies the first device as a node between the second device and the third device.

13. A system comprising:
a database comprising stored data;
a server comprising a plurality of processors in communication with the data in the database, the server programmed to perform a plurality of operations, comprising:
communicating a request for position information of a first device;
receiving the position information and a device ID of the first device;
storing the position information and device ID in the database;
receiving profile information associated with a user of the first device in response to said request;
storing the profile information in the database, said storage associated with stored the position information and device ID;
receiving a request from a second device for the position information, device ID of the first device and the profile information associated with the user of the first device;
determining if the position information of the first device is within a proximity of the second device; and
if the first device is within the proximity, transmitting a notification to the second device.

14. The system of claim 13, wherein the server is programmed to perform further operations comprising:
if the first device is not within the proximity, transmitting a message to the second device indicating that the first device is not within the proximity.

15. The system of claim 13, wherein the server is programmed to perform further operations comprising:
based on the profile information, determining whether the user of the first device and the user of the second device have a relationship.

16. The system of claim 15, wherein the server is programmed to perform further operations comprising:
determining a degree of relationship between the user of the first device and the user of the second device.

17. The system of claim 16, wherein the server is programmed to perform further operations comprising:
based on a degree of relationship, incorporating the position information and profile information of the user of the first device in a user profile of the user of the second device.

18. The system of claim 13, wherein the server is programmed to perform further operations comprising:
in response to said request, receiving at the server a second request from the first device for position information of a third device, the request extending to other devices within a proximity of the first device;
receiving the position information and device ID of the third device; and
storing the position information and device ID of the third device in the database.

19. The system of claim 18, wherein the server is programmed to perform further operations comprising:
if the first device is not within the proximity, correlating the position information for the third device with the position information of the first device to create an expanded range of devices.

20. The system of claim 19, wherein the server is programmed to perform further operations comprising:
transmitting a second notification to the second device second device identifying the third device based on the expanded range.

* * * * *